United States Patent
Dubey et al.

(10) Patent No.: US 7,194,501 B2
(45) Date of Patent: Mar. 20, 2007

(54) COMPLEMENTARY PASS GATE LOGIC IMPLEMENTATION OF 64-BIT ARITHMETIC LOGIC UNIT USING PROPAGATE, GENERATE, AND KILL

(75) Inventors: Sanjay Dubey, Sunnyvale, CA (US); Yoganand Chillarige, Sunnyvale, CA (US); Shivakumar Sompur, Sunnyvale, CA (US); Ban P. Wong, Milpitas, CA (US); Cynthia Tran, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 668 days.

(21) Appl. No.: 10/278,440

(22) Filed: Oct. 22, 2002

(65) Prior Publication Data

US 2004/0078417 A1    Apr. 22, 2004

(51) Int. Cl.
*G06F 7/50* (2006.01)
(52) U.S. Cl. ........................... 708/713; 708/714
(58) Field of Classification Search ............... 708/713
See application file for complete search history.

(56) References Cited

U.S. PATENT DOCUMENTS

| 6,496,846 | B1* | 12/2002 | Bradley | 708/710 |
| 6,954,773 | B2* | 10/2005 | Liu | 708/710 |
| 2003/0061253 | A1* | 3/2003 | Evans | 708/700 |
| 2003/0088603 | A1* | 5/2003 | Wallace | 708/700 |
| 2003/0229661 | A1* | 12/2003 | Kim et al. | 708/710 |
| 2004/0073592 | A1* | 4/2004 | Kim et al. | 708/710 |

* cited by examiner

*Primary Examiner*—Tan V. Mai
(74) *Attorney, Agent, or Firm*—Martine Penilla & Gencarella, LLP

(57) ABSTRACT

An arithmetic logic unit (ALU) implemented with complementary pass gate logic using propagate, generate, and kill is provided. Broadly speaking, the ALU is a 64-bit ALU using a multi-stage global carry chain to generate intermediate fourth-bit carries that are folded with local four-bit sums to efficiently generate a final sum output. The ALU implements ones complement subtraction by incorporating a subtraction select signal to invert each bit of a second operand. The ALU circuitry implements a push-pull methodology to improve performance.

40 Claims, 13 Drawing Sheets

| FIG. 3A |
| FIG. 3B |

COMPLEMENTARY PASS GATE LOGIC IMPLEMENTATION OF 64-BIT ARITHMETIC LOGIC UNIT USING PROPAGATE, GENERATE, AND KILL

BACKGROUND OF THE INVENTION

1. Field of the Invention

The present invention relates generally to microprocessors, and more particularly, to an arithmetic logic unit.

2. Description of the Related Art

An arithmetic logic unit (ALU) is a module of circuitry capable of realizing a set of arithmetic and logic functions. In general the ALU receives a set of input data and creates a set of output data. The input and output data are processed in binary form by the ALU. The ALU is generally used as a standard module in microprocessors. In this manner the same ALU can be used in many different applications. One primary purpose of the ALU in the microprocessor is to perform integer addition operations. It is typical for multiple ALU's to be used in systems that are required to perform large numbers of integer addition operations. As such the ALU characteristics described in terms of speed, power consumption, and chip footprint area become important microprocessor design considerations.

Most ALU's of modern computing system are implemented using dynamic circuitry. Dynamic circuitry is generally used to improve the speed of the ALU. However, use of dynamic circuitry introduces a number of drawbacks with respect to overall system design. For instance, use of dynamic circuitry results in high power consumption and occupation of a large chip footprint area. Also, due to heavy reliance on timing and reference clocks, dynamic circuitry is vulnerable to noise perturbations. Therefore, a large amount of effort and expense must be invested in the successful design of an ALU using dynamic circuitry.

As an alternative to dynamic circuitry, regular static circuitry can be used to implement an ALU. The ALU implemented using regular static circuitry has a lower power consumption and a smaller chip footprint area as compared to the ALU implemented using dynamic circuitry. The use of regular static circuitry also yields a more robust ALU that is less vulnerable to noise perturbations. However, the computational speed of the ALU implemented using regular static circuitry is generally not competitive with an ALU implemented using dynamic circuitry.

In view of the foregoing, there is a need for an ALU that combines the beneficial characteristics of a dynamically implemented ALU and a regular statically implemented ALU. More specifically, there is a need for an ALU that offers the high speed of a dynamically implemented ALU while also offering the low power consumption and the small chip footprint area of regular statically implemented ALU.

SUMMARY OF THE INVENTION

Broadly speaking, the present invention fills these needs by providing an arithmetic logic unit (ALU) implemented with complementary pass gate logic using propagate, generate, and kill. The ALU uses a multi-stage global carry chain to generate intermediate fourth-bit carries that are folded with local four-bit sums to efficiently generate a final sum output. The ALU also implements ones complement subtraction by incorporating a subtraction select signal to invert each bit of a second operand. Also, the circuitry of the ALU implements a push-pull methodology to improve performance. It should be appreciated that the present invention can be implemented in numerous ways, including as a process, an apparatus, a system, a device, or a method. Several embodiments of the present invention are described below.

In one embodiment, arithmetic logic processing circuitry is disclosed. The arithmetic logic processing circuitry includes a global carry chain implementing static propagate, kill, and generate circuitry. The global carry chain includes a first stage, a second stage, a third stage, and a fourth stage. The first stage is for generating first propagate, kill, and generate signals for each bit of a pair of multi-bit signal vectors. The second stage is for generating second propagate, kill, and generate signals for a first group of the first propagate, kill, and generate signals. The third stage is for generating third propagate, kill, and generate signals for a first group of the second propagate, kill, and generate signals. The fourth stage is for generating carry signals and carry complement signals. The fourth stage is configured to receive inputs from each of the second stage and the third stage. The carry signals and the carry complement signals generated by the fourth stage are useful for generating one of a sum result and a subtraction result.

In another embodiment, a method for making arithmetic logic processing circuitry is disclosed. The method includes implementing a global carry chain using static propagate, kill, and generate circuitry. The global carry chain is implemented by implementing a first stage, a second stage, a third stage, and a fourth stage. Implementation of the first stage is performed to generate first propagate, kill, and generate signals for each bit of a pair of multi-bit signal vectors. Implementation of the second stage is performed to generate second propagate, kill, and generate signals for a first group of the first propagate, kill, and generate signals. Implementation of the third stage is performed to generate third propagate, kill, and generate signals for a first group of the second propagate, kill, and generate signals. Implementation of the fourth stage is performed to generate carry signals and carry complement signals. The fourth stage is implemented to receive inputs from each of the second stage and the third stage. The carry signals and the carry complement signals generated by implementation of the fourth stage are useful for generating one of a sum result and a subtraction result.

In another embodiment, arithmetic logic unit circuitry is disclosed. The arithmetic logic unit circuitry includes a multi-stage global carry chain. The multi-stage global carry chain implements static propagate, kill, and generate circuitry for generating carry signals associated with a pair of multi-bit signal vectors. The carry signals are useful for generating one of a sum result and a subtraction result for the pair of multi-bit signal vectors. The arithmetic logic unit circuitry also includes a summation processing circuit for creating sum and sum complement signals for each bit in the pair of multi-bit signal vectors. The summation processing circuit is further configured to fold the sum and sum complement signals with the carry signals to produce a final sum output signal vector.

Other aspects of the invention will become more apparent from the following detailed description, taken in conjunction with the accompanying drawings, illustrating by way of example the present invention.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE PREFERRED EMBODIMENTS

An invention is disclosed for an arithmetic logic unit (ALU) implemented with complementary pass gate logic using propagate, generate, and kill. Broadly speaking, the present invention is a 64-bit ALU that uses a multi-stage global carry chain to generate intermediate fourth-bit carries that can be folded with local four-bit sums to efficiently generate a final sum output. The ALU of the present invention also implements ones complement subtraction by incorporating a subtraction select signal to invert each bit of a second operand. Additionally, the circuitry of the ALU of the present invention implements a push-pull methodology to improve performance. As compared to an ALU implemented using dynamic circuitry, the ALU of the present invention uses less power, occupies less area, has comparable speed, and is more robust.

In the following description, numerous specific details are set forth in order to provide a thorough understanding of the present invention. It will be apparent, however, to one skilled in the art that the present invention may be practiced without some or all of these specific details. In other instances, well known process operations have not been described in detail in order not to unnecessarily obscure the present invention.

Figure 1:
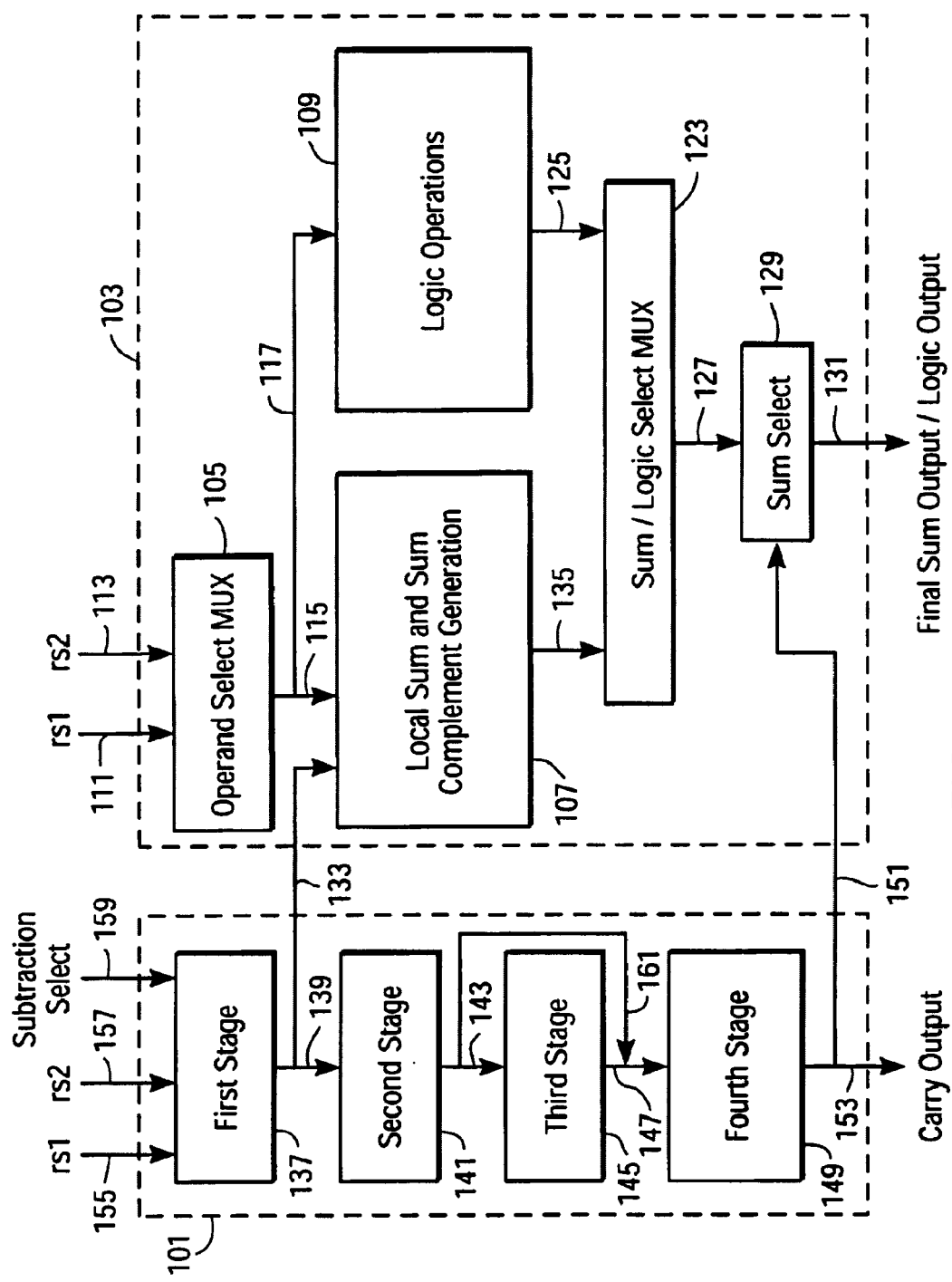
FIG. 1 is an illustration showing an arithmetic logic unit (ALU), in accordance with one embodiment of the present invention.

FIG. 1 is an illustration showing an ALU, in accordance with one embodiment of the present invention. The ALU includes a global carry chain 101 and a sum and logic block 103. The sum and logic block 103 receives a 64-bit signal vector (rs1) and a 64-bit signal vector (rs2) into an operand select multiplexer 105 through communication pathways 111 and 113, respectively.

If a logic operation is to be performed, the operand select multiplexer 105 passes a signal indicating such through a communication pathway 117 to a logic operations block 109. The operand select multiplexer 105 will also pass rs1 and rs2 to the logic operations block 109. The logic operations block 109 is capable of performing a plurality of logical operations on rs1 and rs2. In one embodiment the logic operations block 109 will perform operations such as AND, ANDcc, ANDN, ANDNcc, OR, ORcc, ORN, ORNcc, XOR, XORcc, XNOR, and XNORcc. In other embodiments, the logic operations block 109 will be capable of performing other well known logical operations on rs1 and rs2. The logic operations block 109 passes a logic operation result to a sum/logic select multiplexer 123 through a communication pathway 125. If a logic operation is to be performed, the sum/logic select multiplexer 123 will pass the logic operation result through a communication pathway 127 to a sum select block 129. If a logic operation is to be performed, the logic operation result will be passed from the sum select block 129 through a communication pathway 131 as a logic output.

If an addition or subtraction operation is to be performed, the operand select multiplexer 105 passes a signal indicating such through a communication pathway 115 to a local sum and sum complement generation block 107. Bit-wise propagate, kill, and generate signals are passed through a communication pathway 133 from a first stage 137 of the global carry chain 101 to the local sum and sum complement generation block 107. Using the bit-wise propagate, kill, and generate signals, the local sum and sum complement generation block 107 creates a sum and a sum complement for each consecutive group of four bits between bit-0 and bit-63. The sum and sum complement for each consecutive group of four bits are passed through a communication pathway 135 to the sum/logic select multiplexer 123. If an addition or subtraction operation is to be performed, the sum/logic select multiplexer 123 will pass the sum and sum complement for each consecutive group of four bits through the communication pathway 127 to the sum select block 129. A carry and carry complement corresponding to bit-0 through bit-j for every fourth bit-j is provided from a fourth stage 149 of the global carry chain 101 through a communication pathway 151 to be used as input to the sum select block 129. The sum select block 129 folds the carry and carry complement input with the sum and sum complement input to determine a final sum output. The final sum output is provided from the sum select block 129 through a communication pathway 131.

The global carry chain 101 includes the first stage 137, a second stage 141, a third stage 145, and the fourth stage 149. The first stage 137 receives rs1, rs2, and a subtraction select signal as input through communication pathways 155, 157, and 159, respectively. Output from the first stage 137 is provided through a communication pathway 139 to the second stage 141 and also through a communication pathway 133 to the local sum and sum complement generation block 107. Output from the second stage 141 is provided through a communication pathway 143 to the third stage 145 and also through a communication pathway 161 to the fourth stage 149. Output from the third stage 145 is provided through a communication pathway 147 to the fourth stage 149. The fourth stage 149 provides carry and carry complement output through communication pathway 151 to the sum select block 129. The fourth stage 149 also provides a carry output signal through a communication pathway 153. The following discussion provides details corresponding to the implementation of the four stages of the global carry chain 101.

Figure 2A:
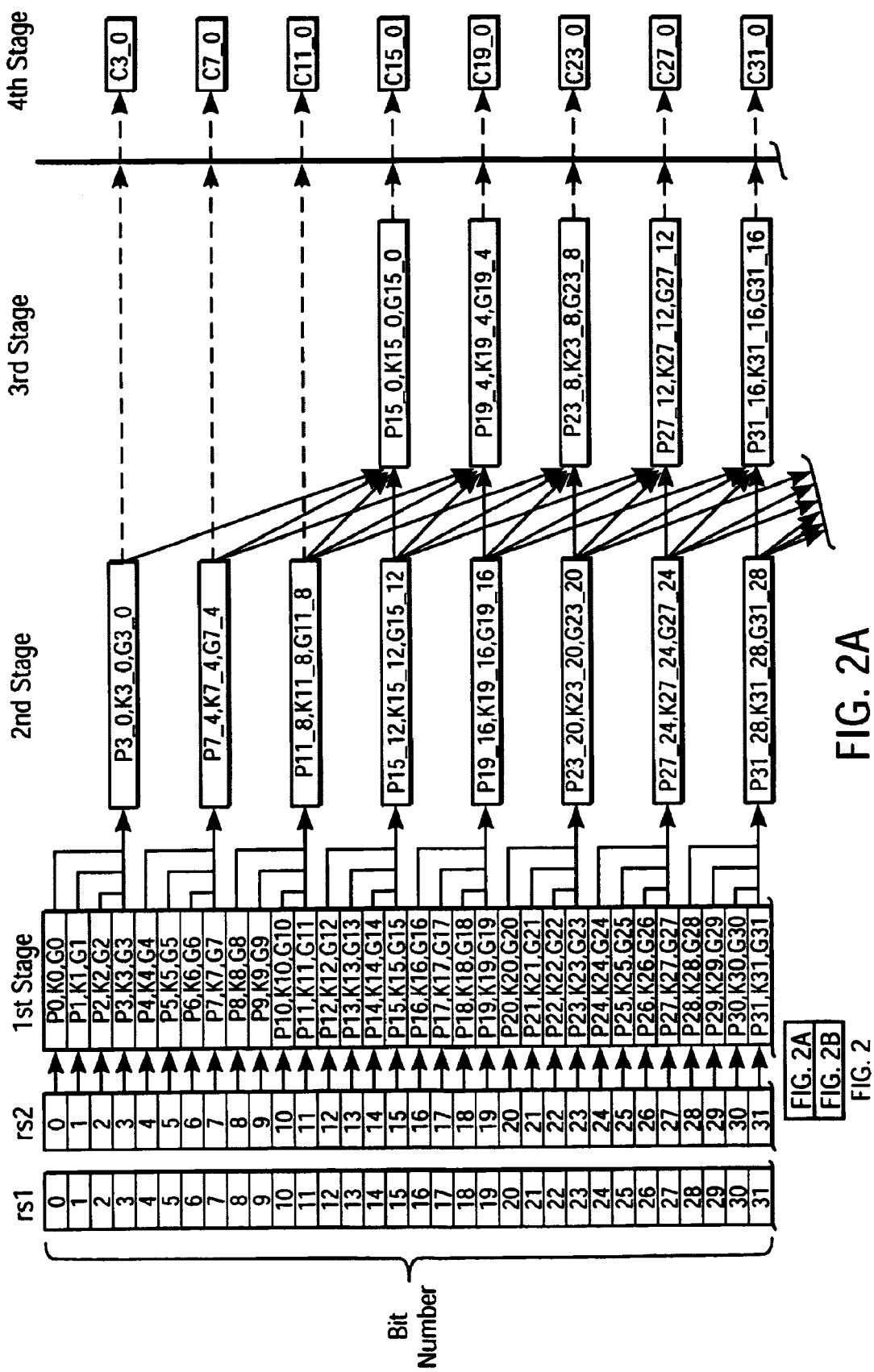
FIGS. 2A–2B show a diagram of data flow through the four stages of the global carry chain, in accordance with one embodiment of the invention.
Figure 2B:
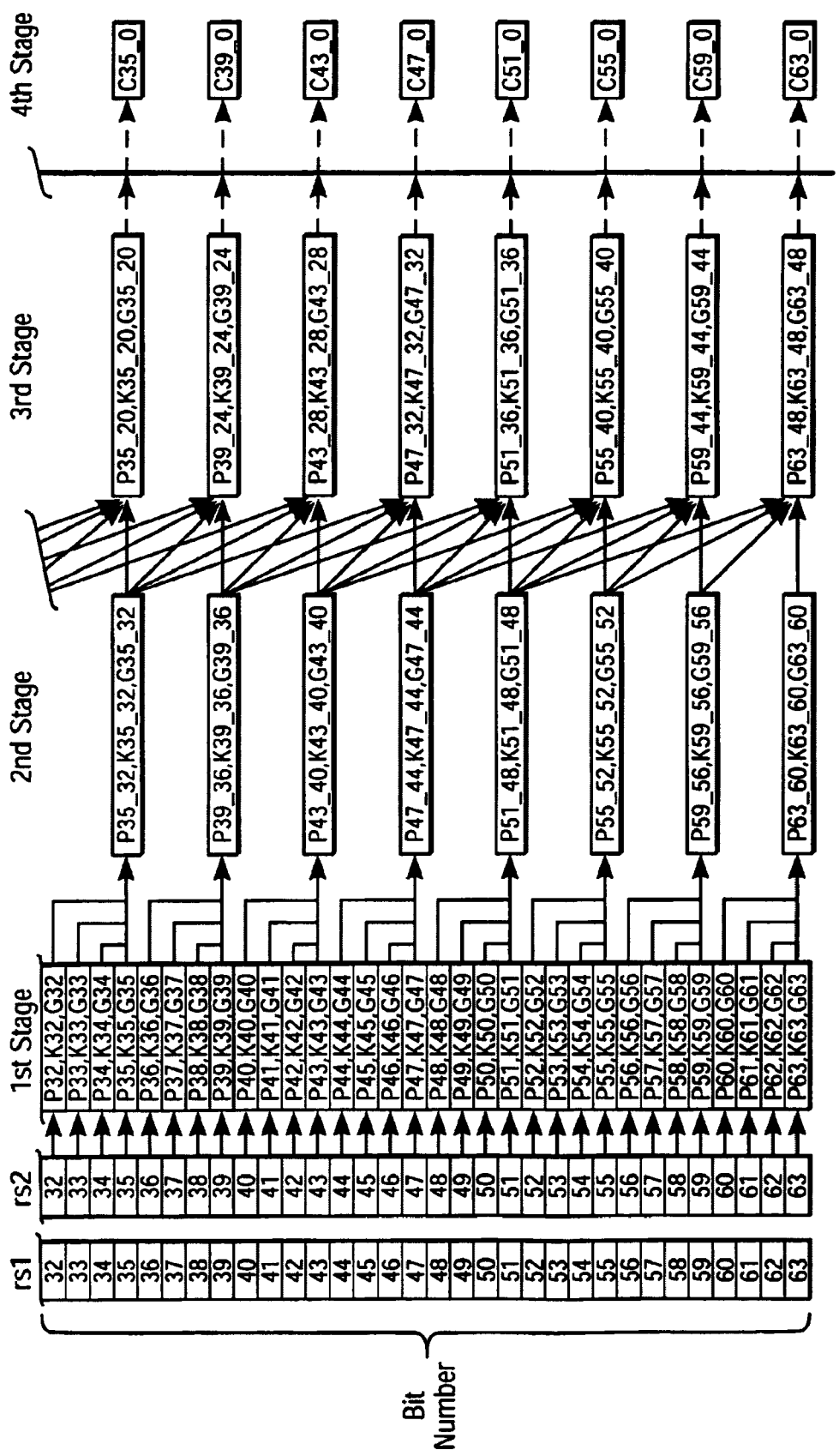

FIGS. 2A–2B show a diagram of data flow through the four stages of the global carry chain 101, in accordance with one embodiment of the invention. The 64-bit signal vector (rs1), the 64-bit signal vector (rs2), and the subtraction select signal are passed to the first stage 137 of the global carry chain 101. In the first stage 137, a propagate signal, a kill signal, and a generate signal are created for each of the 64 bits (i.e., bit-0 through bit-63). The first stage 137 also combines the subtraction select signal with the creation of the propagate, kill, and generate signals to implement one's complement subtraction. When the subtraction select signal is high, rs2 is to be subtracted from rs1. A high subtraction select signal essentially causes the complement of rs2 (i.e., rs2') to be added to rs1. In rs2', each high bit of the rs2 signal vector becomes low and, conversely, each low bit of the rs2 signal vector becomes high. Thus, when the subtraction select signal is high, one's complement subtraction is performed by adding rs2' (i.e., the complement of rs2) to rs1. Table 1 presents the equations used to implement the first stage 137 of the global carry chain 101.

The second stage 141 of the global carry chain 101 is implemented on consecutive groups of four bits beginning with the group defined by bit-0 through bit-3 and ending with the group defined by bit-60 through bit-63. The second stage 141 creates a four-bit propagate signal, a four-bit kill signal, and a four-bit generate signal for each of the sixteen consecutive groups of four bits between bit-0 and bit-63. The propagate, kill, and generate signals for each bit as previously created in stage one 137 are used as input to the second stage 141. For example, the propagate ($P_0$, $P_1$, $P_2$, $P_3$), kill ($K_0$, $K_1$, $K_2$, $K_3$), and generate ($G_0$, $G_1$, $G_2$, $G_3$) signals for bit-0 through bit-3 are used in the second stage 141 to create the propagate ($P_{3\_0}$), kill ($K_{3\_0}$), and generate ($G_{3\_0}$) signals corresponding to the first group of four bits. As another example, the propagate ($P_{60}$, $P_{61}$, $P_{62}$, $P_{63}$), kill ($K_{60}$, $K_{61}$, $K_{62}$, $K_{63}$), and generate ($G_{60}$, $G_{61}$, $G_{62}$, $G_{63}$) signals for bit-60 through bit-63 are used in the second stage 141 to create the propagate ($P_{63\_60}$), kill ($K_{63\_60}$), and generate ($G_{63\_60}$) signals corresponding to the sixteenth group of four bits. Tables 2A, 2B, and 2C present the equations used to implement the second stage 141 of the global carry chain 101.

The third stage 145 of the global carry chain 101 creates thirteen sets of propagate, kill, and generate signals, wherein each set is based on four successive groups of propagate, kill, and generate signals created in the second stage 141. For example, the first set of propagate ($P_{15\_0}$), kill ($K_{150}$), and generate ($G_{150}$) signals in the third stage 145 represents a combination of the first through fourth group of four bits each ($P_{3\_0}$, $K_{30}$, $G_{3\_0}$, $P_{7\_4}$, $K_{7\_4}$, $G_{74}$, $P_{11\_8}$, $K_{11\_8}$, $G_{118}$, $P_{15\_12}$, $K_{15\_12}$, and $G_{15\_12}$) from the second stage 141. Continuing with the example, the second set of propagate ($P_{19\_4}$), kill ($K_{19\_4}$), and generate ($G_{19\_4}$) signals in the third stage 145 represents a combination of the second through fifth group of four bits each ($P_{7\_4}$, $K_{7\_4}$, $G_{7\_4}$, $P_{11\_8}$, $K_{11\_8}$, $G_{11\_8}$, $P_{15\_12}$, $K_{15\_12}$, $G_{15\_12}$, $P_{19\_16}$, $K_{19\_16}$, and $G_{19\_16}$) from the second stage 141. The remainder of the third stage 145 propagate, kill, and generate signals are created in the same manner. Hence, the thirteenth set of propagate ($P_{63\_48}$), kill ($K_{63\_48}$), and generate ($G_{63\_48}$) signals in the third stage 145 represents a combination of the thirteenth through sixteenth group of four bits each ($P_{51\_48}$, $K_{51\_48}$, $G_{51\_48}$, $P_{55\_52}$, $K_{55\_52}$, $G_{55\_52}$, $P_{59\_56}$, $K_{59\_56}$, $G_{59\_56}$, $P_{63\_60}$, $K_{63\_60}$, and $G_{63\_60}$) from the second stage 141. Tables 3A, 3B, and 3C present the equations used to implement the third stage 145 of the global carry chain 101.

The fourth stage 149 of the global carry chain 101 creates a carry ($C_{j\_0}$) and a carry complement signal ($C_{j\_0}'$) corresponding to bit-0 through bit-j for every fourth bit-j (i.e., bit-3, bit-7, bit-11, bit-15, bit-19, bit-23, bit-27, bit-31, bit-35, bit-39, bit-43, bit-47, bit-51, bit-55, bit-59, bit-63). The propagate, kill, and generate signals created by the first three groups in the second stage 141 (i.e., $P_{3\_0}$, $K_{3\_0}$, $G_{3\_0}$, $P_{7\_4}$, $K_{7\_4}$, $G_{7\_4}$, $P_{11\_8}$, $K_{11\_8}$, and $G_{11\_8}$) along with each set of propagate, kill, and generate signals created by the third stage 145 are used in various combinations to create each $C_{j\_0}$ and $C_{j\_0}'$ in the fourth stage 149. Tables 4A and 4B present the equations used to implement the fourth stage 149 of the global carry chain 101.

Figures 3, 3A:
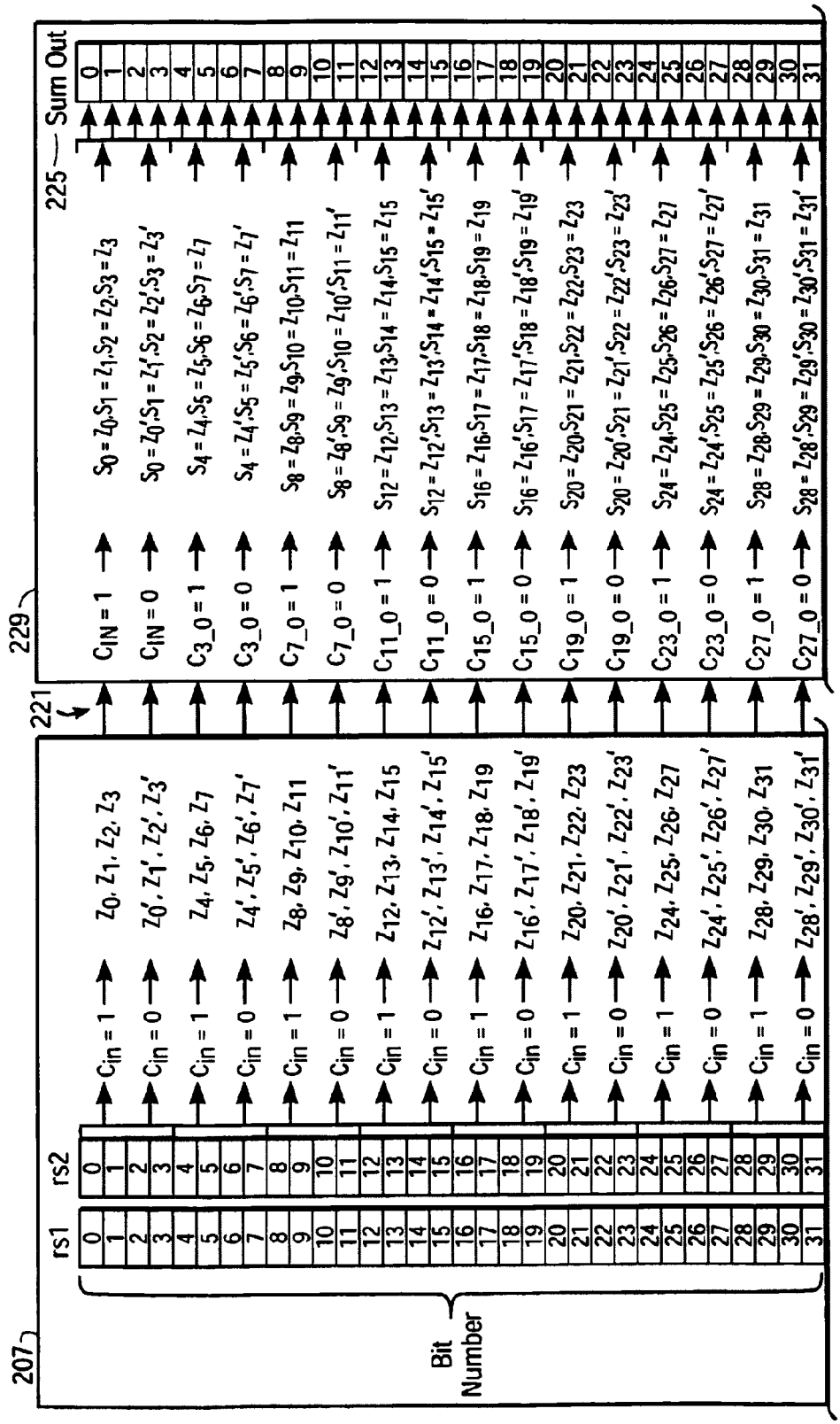
FIGS. 3A–3B show a diagram of data flow through the local sum and sum complement block and the sum select block, in accordance with one embodiment of the invention.
Figure 3B:
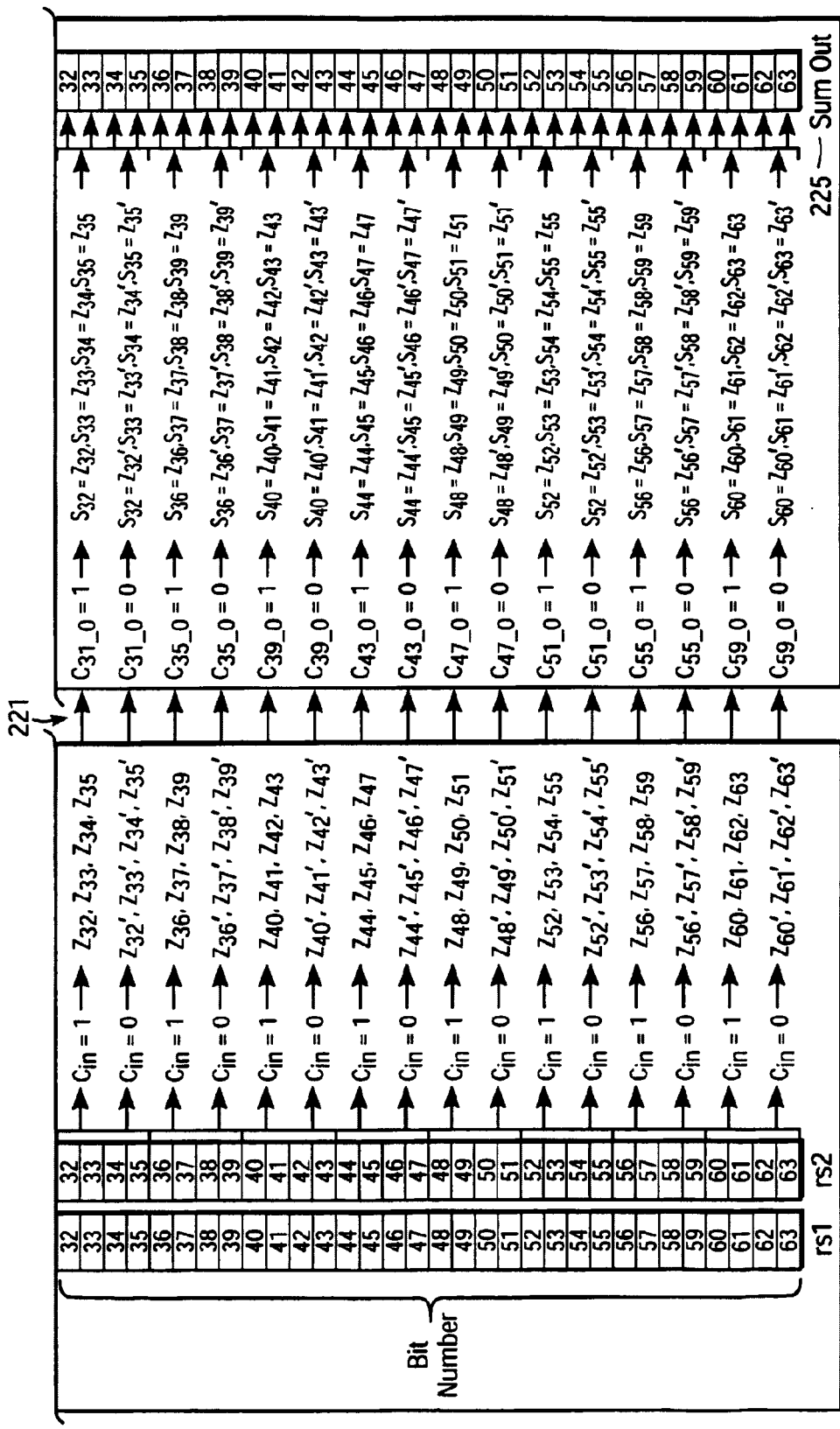

FIGS. 3A–3B show a diagram of data flow through the local sum and sum complement block 107 and the sum select block 129, in accordance with one embodiment of the invention. The data created by the local sum and sum complement block 107 is shown in block 207. The propagate, kill, and generate signals created for each of the 64 bits (i.e., bit-0 through bit-63) in the first stage 137 are used to create a sum ($Z_j$ for bit-j) signal and a sum complement ($Z_j'$ for bit-j) signal for each bit in the sum and sum complement block 107. The $Z_j$ and $Z_j'$ signals are determined based on a 4-bit adder methodology assuming a carry-in ($C_{in}$) of 1 for the $Z_j$ signals and a $C_{in}$ of 0 for $Z_j'$ signals. Thus, the propagate, kill, and generate signals from the first stage 137 for each consecutive group of 4 bits from bit-0 through bit-63 are passed through a dual 4-bit adder implementing both $C_{in}=1$ and $C_{in}=0$. For example, the propagate, kill, and generate signals for bit-0 through bit-3 are passed through a 4-bit adder that uses a $C_{in}=1$ to create a set of sum signals including $Z_0$, $Z_1$, $Z_2$, and $Z_3$. The propagate, kill, and generate signals for bit-0 through bit-3 are also passed through a 4-bit adder that uses a $C_{in}=0$ to create a set of sum signals including $Z_0'$, $Z_1'$, $Z_2'$, and $Z_3'$. Each consecutive group of 4 bits are processed in this manner until the final group including bit-60 through bit-63 are processed to create a set of signals including $Z_{60}$, $Z_{61}$, $Z_{62}$, $Z_{63}$ $Z_{60}'$, $Z_{61}'$, $Z_{62}'$, and $Z_{63}'$. Tables 5 presents the equations used to create the sum and sum complement for each bit as previously described.

The $Z_j$ and $Z_j'$ signals for each bit are passed from the local sum and sum complement block 107 to the sum select block 129, as indicated by the plurality of arrows positioned between the block 207 and a block 229 in FIGS. 3A–3B. The data flow shown in block 229 generally describes the processing performed by the sum select block 129. Depending on the signal value of the cumulative preceding carry-in, the sum select block 129 provides either $Z_j$ or $Z_j'$ to an output signal vector (Sum Out 225). If the cumulative preceding carry-in value (i.e., the carry-in value for bit-0 through bit-j) is high, the sum select block 129 will provide the $Z_j$ signals for the next four bits (i.e., bit-(j+1), bit-(j+2), bit-(j+3), and bit-(j+4)) to corresponding bits in Sum Out 225. If the cumulative preceding carry-in value (i.e., the carry-in value for bit-0 through bit-j) is low, the sum select block 129 will provide the $Z_j'$ signals for the next four bits (i.e., bit-(j+1), bit-(j+2), bit-(j+3), and bit-(j+4) to corresponding bits in Sum Out 225. In this manner the Sum Out 225 signal vector is created and represents the final sum output that is provided from the sum select block 129 through the communication pathway 131. Also, the carry output signal provided through communication pathway 153 from the fourth stage 149 represents a cumulative carry from bit-0 through bit-63 (i.e., $C_{63\_0}$). A high $C_{63\_0}$ signal is used to indicate an overflow condition.

Figure 4A:
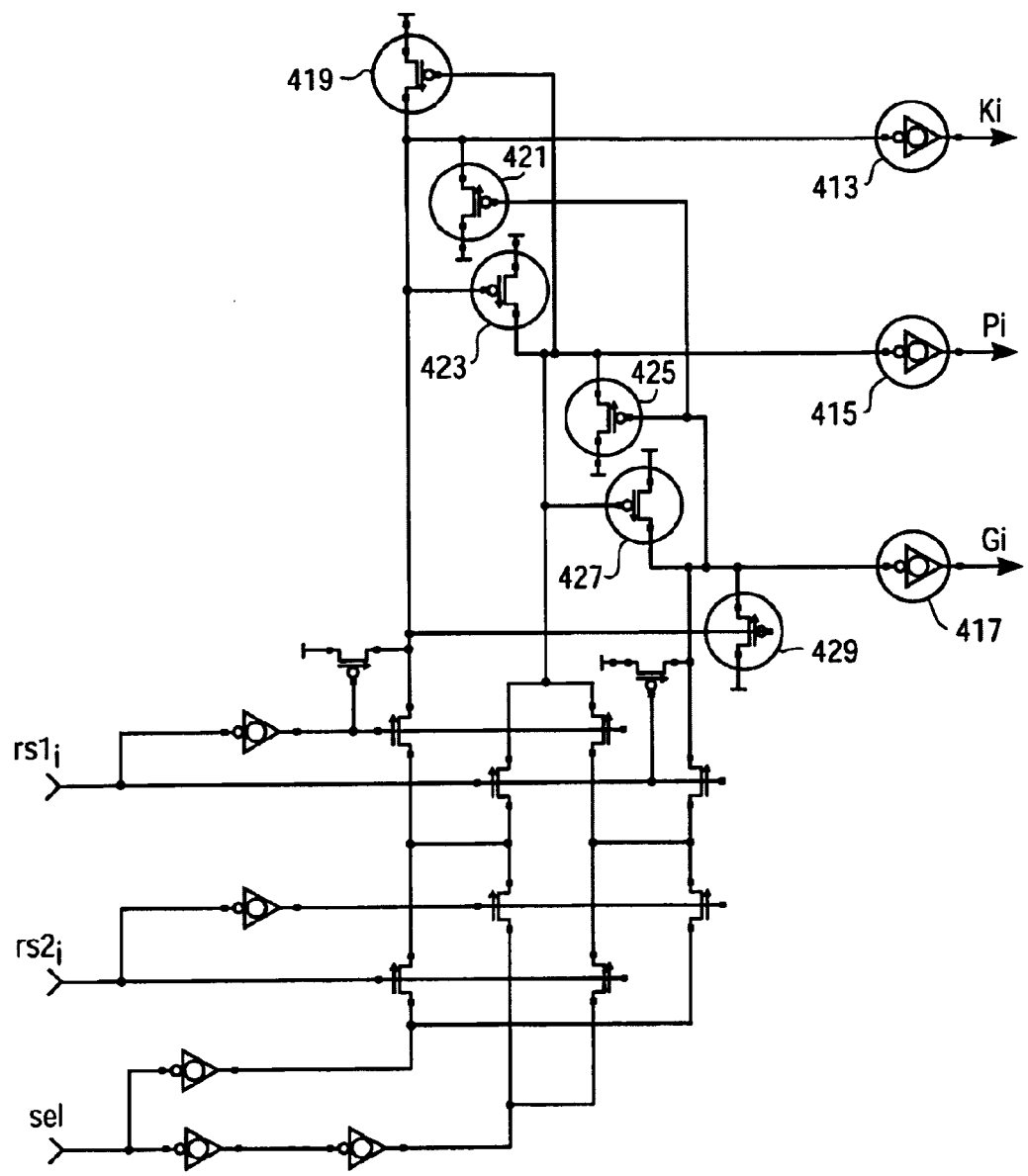
FIG. 4A is an illustration showing an exemplary circuit implementing the first stage of the global carry chain for a bit-i, in accordance with one embodiment of the invention.

FIG. 4A is an illustration showing an exemplary circuit implementing the first stage 137 of the global carry chain 101 for a bit-i, in accordance with one embodiment of the invention. The bit-i circuitry for the first stage 137 receives as input a signal ($rs1_i$) from bit-i of signal vector rs1, a signal ($rs2_i$) from bit-i of signal vector rs2, and a subtraction selection signal (sel). The bit-i circuitry for the first stage 137 implements the equations presented in Table 1 to generate a propagate signal for bit-i ($P_i$), a kill signal for bit-i ($K_i$), and a generate signal for bit-i ($G_i$). Per the equations in Table 1, only one of $P_i$, $K_i$, and $G_i$ can be high for a given bit-i. The bit-i circuitry for the first stage 137 takes advantage of this fact to incorporate a push-pull methodology to enhance the corresponding circuit performance.

If either $P_i$, $K_i$, or $G_i$ is to be generated as a high signal, the corresponding signal prior to inverters 415, 413, or 417, respectively, will be low. Similarly, if either $P_i$, $K_i$, or $G_i$ is to be generated as a low signal, the corresponding signal prior to inverter 415, 413, or 417, respectively, will be high. Just prior to entering the inverters 415, 413, or 417, the one low signal will cause the two high signals to be pushed high (i.e., refreshed). Thus, when passing through the inverters 415, 413, or 417, the two recently refreshed high signals will be inverted to two well-defined low signals, and the one low signal will inverted to one well-defined high signal. A low $P_i$ signal prior to inverter 415 causes PMOS devices 419 and 427 to refresh the high $K_i$ and $G_i$ signals, respectively, prior to inverters 413 and 417, respectively. A low $K_i$ signal prior to inverter 413 causes PMOS devices 423 and 429 to refresh the high $P_i$ and $G_i$ signals, respectively, prior to inverters 415 and 417, respectively. A low $G_i$ signal prior to inverter 417 causes PMOS devices 421 and 425 to refresh the high $K_i$ and $P_i$ signals, respectively, prior to inverters 413 and 415, respectively. In this manner, the push-pull methodology is implemented to enhance the corresponding circuit performance.

Figure 4B:
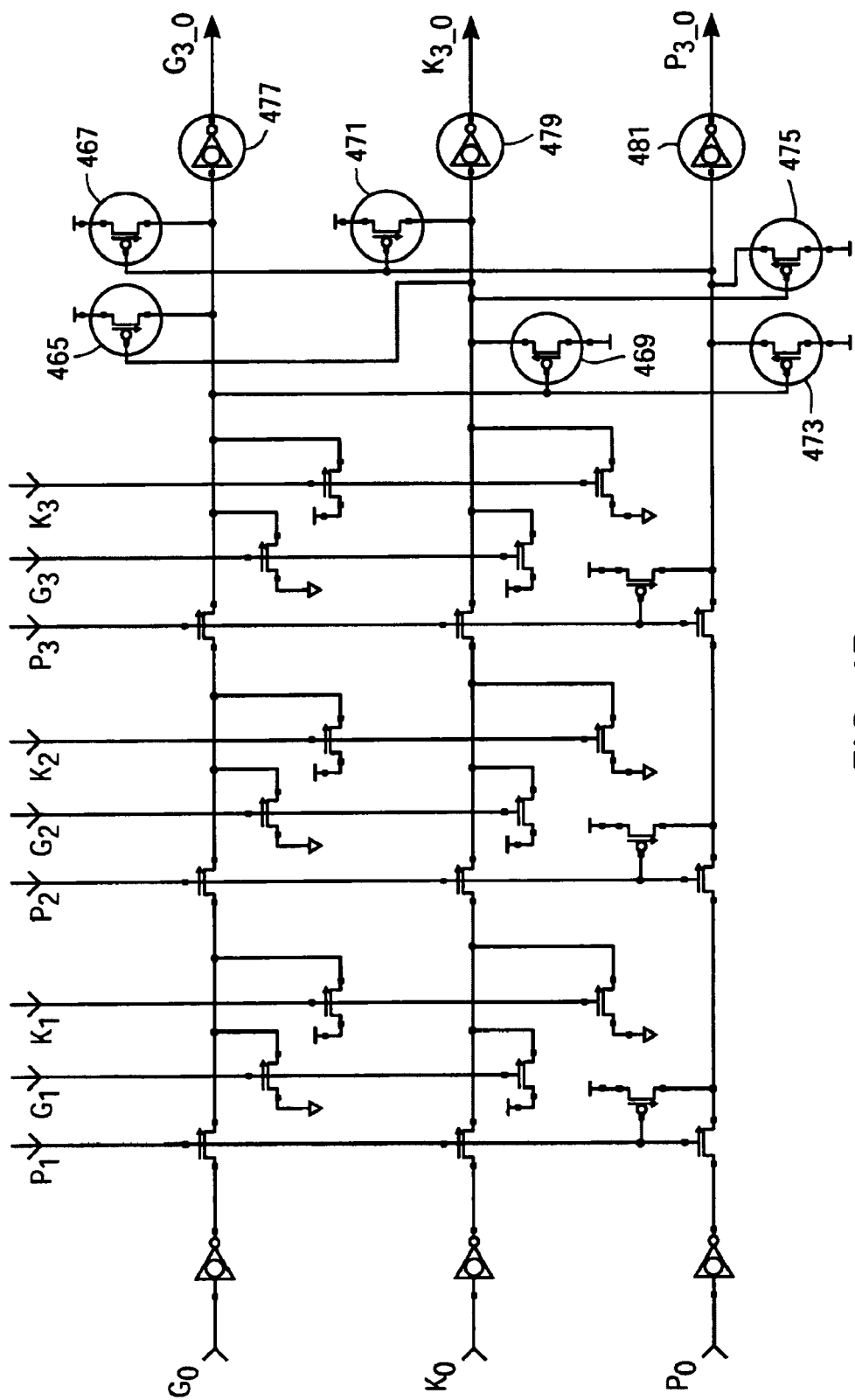
FIG. 4B is an illustration showing an exemplary circuit implementing the second stage of the global carry chain for bit-0 through bit-3, in accordance with one embodiment of the invention.

FIG. 4B is an illustration showing an exemplary circuit implementing the second stage 141 of the global carry chain 101 for bit-0 through bit-3, in accordance with one embodiment of the invention. The exemplary circuitry for the second stage 141 receives as input a set of propagate, kill, and generate signals for each bit. For bit-0, a propagate signal ($P_0$), a kill signal ($K_0$), and a generate signal ($G_0$) is received as input. For bit-1, a propagate signal ($P_1$), a kill signal ($K_1$), and a generate signal ($G_1$) is received as input. For bit-2, a propagate signal ($P_2$), a kill signal ($K_2$), and a generate signal ($G_2$) is received as input. For bit-3, a propagate signal ($P_3$), a kill signal ($K_3$), and a generate signal ($G_3$) is received as input. The exemplary circuitry for the second stage 141 implements the equations presented in Tables 2A, 2B, and 2C to generate a propagate signal ($P_{3\_0}$), a kill signal ($K_{3\_0}$), and a generate signal ($G_{3\_0}$), for the set of bits from bit-0 through bit-3. Per the equations in Tables 2A, 2B, and 2C, only one of $P_{3\_0}$, $K_{3\_0}$, and $G_{3\_0}$ can be high at a given time. The circuitry for the second stage 141 takes advantage of this fact to incorporate a push-pull methodology to enhance the corresponding circuit performance.

If either $P_{3\_0}$, $K_{3\_0}$, or $G_{3\_0}$ is to be generated as a high signal, the corresponding signal prior to inverters 481, 479, or 477, respectively, will be low. Similarly, if either $P_{3\_0}$, $K_{3\_0}$, or $G_{3\_0}$ is to be generated as a low signal, the corresponding signal prior to inverter 481, 479, or 477, respectively, will be high. Just prior to entering the inverters 481, 479, or 477, the one low signal will cause the two high signals to be pushed high (i.e., refreshed). Thus, when passing through the inverters 481, 479, or 477, the two recently refreshed high signals will be inverted to two well-defined low signals, and the one low signal will inverted to one well-defined high signal. A low $P_{3\_0}$ signal prior to inverter 481 causes PMOS devices 471 and 467 to refresh the high $K_{3\_0}$ and $G_{3\_0}$ signals, respectively, prior to inverters 479 and 477, respectively. A low $K_{3\_0}$ signal prior to inverter 479 causes PMOS devices 475 and 465 to refresh the high $P_{3\_0}$ and $G_{3\_0}$ signals, respectively, prior to inverters 481 and 477, respectively. A low $G_{3\_0}$ signal prior to inverter 477 causes PMOS devices 469 and 473 to refresh the high $K_{3\_0}$ and $P_{3\_0}$ signals, respectively, prior to inverters 479 and 481, respectively. In this manner, the push-pull methodology is implemented to enhance the corresponding circuit performance. In other embodiments of the present invention, a plurality of PMOS devices can be implemented in a similar manner at other locations within the circuit where a pair of signals are mutually exclusive. In this manner, the low signal in the pair of signals is used to control a PMOS device configured to refresh the complementary high signal in the pair of signals.

Figure 4C:
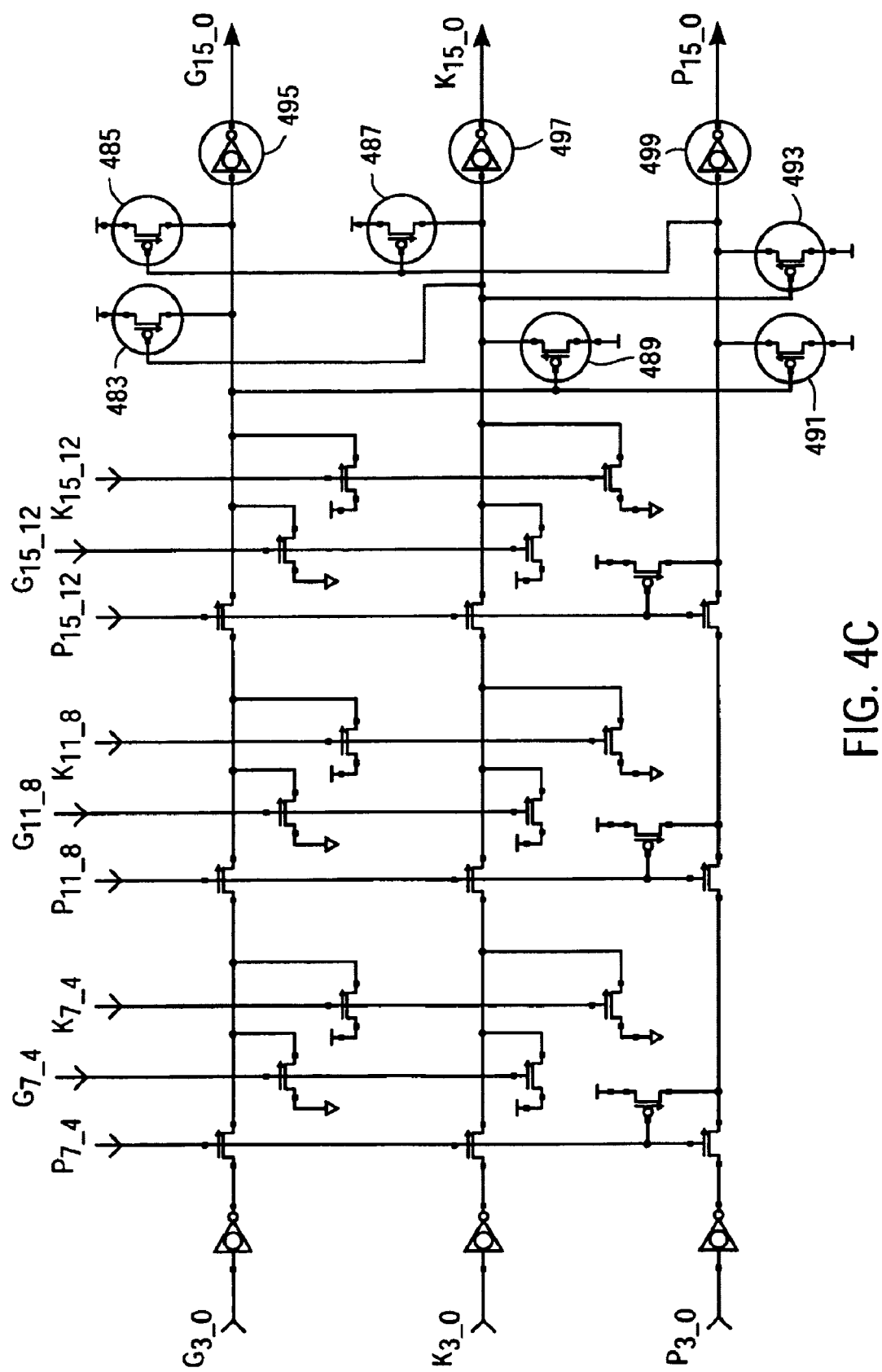
FIG. 4C is an illustration showing an exemplary circuit implementing the third stage of the global carry chain for the first through fourth group of four bits each from the second stage, in accordance with one embodiment of the invention.

FIG. 4C is an illustration showing an exemplary circuit implementing the third stage 145 of the global carry chain 101 for the first through fourth group of four bits each from the second stage 141, in accordance with one embodiment of the invention. The exemplary circuitry for the third stage 145 receives as input a set of propagate, kill, and generate signals for the first through fourth group of four bits each from the second stage 141 (i.e., $P_{3\_0}$, $K_{3\_0}$, $G_{3\_0}$, $P_{7\_4}$, $K_{7\_4}$, $G_{7\_4}$, $P_{11\_8}$, $K_{11\_8}$, $G_{11\_8}$, $P_{15\_12}$, $K_{15\_12}$, For the first group of four bits, a propagate signal ($P_{3\_0}$), a kill signal ($K_{3\_0}$), and a generate signal ($G_{3\_0}$) is received as input. For the second group of four bits, a propagate signal ($P_{7\_4}$), a kill signal ($K_{7\_4}$), and a generate signal ($G_{7\_4}$) is received as input. For the third group of four bits, a propagate signal ($P_{11\_8}$), a kill signal ($K_{11\_8}$), and a generate signal ($G_{11\_8}$) is received as input. For the fourth group of four bits, a propagate signal ($P_{15\_12}$), a kill signal ($K_{15\_12}$), and a generate signal ($G_{15\_12}$) is received as input. The exemplary circuitry for the third stage 145 implements the equations presented in Tables 3A, 3B, and 3C to generate a propagate signal ($P_{15\_0}$), a kill signal ($K_{15\_0}$), and a generate signal ($G_{15\_0}$), for the first through fourth group of four bits each from the second stage 141. Per the equations in Tables 3A, 3B, and 3C, only one of $P_{15\_0}$, $K_{15\_0}$, and $G_{15\_0}$ can be high at a given time. The circuitry for the third stage 145 takes advantage of this fact to incorporate a push-pull methodology to enhance the corresponding circuit performance.

If either $P_{15\_0}$, $K_{15\_0}$, or $G_{15\_0}$ is to be generated as a high signal, the corresponding signal prior to inverters 499, 497, or 495, respectively, will be low. Similarly, if either $P_{15\_0}$, $K_{15\_0}$, or $G_{15\_0}$ is to be generated as a low signal, the corresponding signal prior to inverter 499, 497, or 495, respectively, will be high. Just prior to entering the inverters 499, 497, or 495, the one low signal will cause the two high signals to be pushed high (i.e., refreshed). Thus, when passing through the inverters 499, 497, or 495, the two recently refreshed high signals will be inverted to two well-defined low signals, and the one low signal will inverted to one well-defined high signal. A low $P_{15\_0}$ signal prior to inverter 499 causes PMOS devices 487 and 485 to refresh the high $K_{15\_0}$ and $G_{15\_0}$ signals, respectively, prior to inverters 497 and 495, respectively. A low $K_{15\_0}$ signal prior to inverter 497 causes PMOS devices 493 and 483 to refresh the high $P_{15\_0}$ and $G_{15\_0}$ signals, respectively, prior to inverters 499 and 495, respectively. A low $G_{15\_0}$ signal prior to inverter 495 causes PMOS devices 489 and 491 to refresh the high $K_{15\_0}$ and $P_{15\_0}$ signals, respectively, prior to inverters 497 and 499, respectively. In this manner, the push-pull methodology is implemented to enhance the corresponding circuit performance. In other embodiments of the present invention, a plurality of PMOS devices can be implemented in a similar manner at other locations within the circuit where a pair of signals are mutually exclusive. In this manner, the low signal in the pair of signals is used to control a PMOS device configured to refresh the complementary high signal in the pair of signals.

Figure 4D:
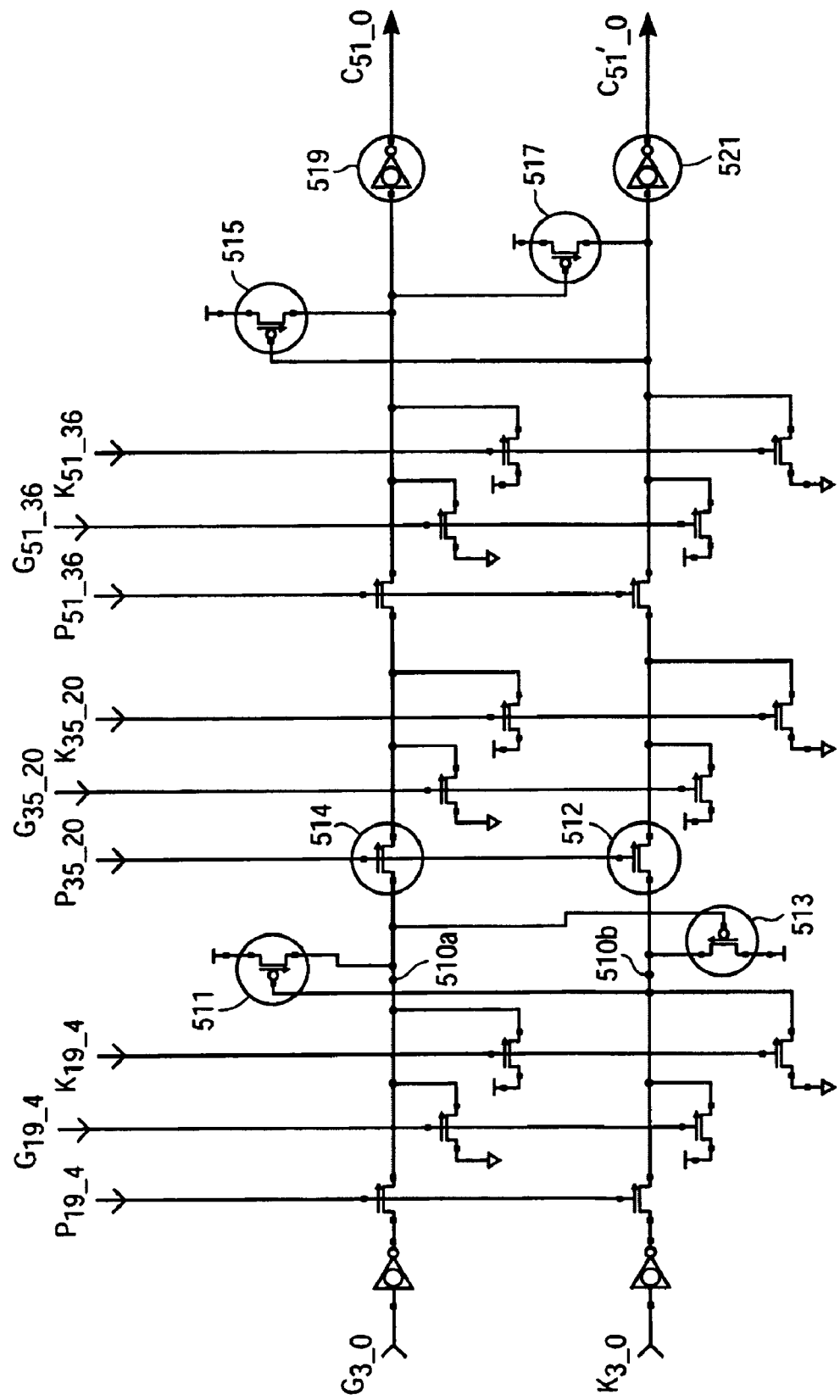
FIG. 4D is an illustration showing an exemplary circuit implementing the fourth stage of the global carry chain for creating a carry ($C_{51\_0}$) and a carry complement signal ($C_{51\_0}'$) corresponding to bit-0 through bit-51, in accordance with one embodiment of the invention.

FIG. 4D is an illustration showing an exemplary circuit implementing the fourth stage 149 of the global carry chain 101 for creating a carry ($C_{51\_0}$) and a carry complement signal ($C_{51\_0}'$) corresponding to bit-0 through bit-51, in accordance with one embodiment of the invention. The exemplary circuitry for creating $C_{51\_0}$ and $C_{51\_0}'$ receives as input a generate signal ($G_{3\_0}$) and a kill signal ($K_{3\_0}$) for bit-0 through bit-3 from the second stage 141. Also, the exemplary circuitry receives as input a propagate signal ($P_{19\_4}$), a kill signal ($K_{19\_4}$), and a generate signal ($G_{19\_4}$) corresponding to bit-4 through bit-19 from the third stage 145. Also, the exemplary circuitry receives as input a propagate signal ($P_{35\_20}$), a kill signal ($K_{35\_20}$), and a generate signal ($G_{35\_20}$) corresponding to bit-20 through bit-35 from the third stage 145. Also, the exemplary circuitry receives as input a propagate signal ($P_{51\_36}$), a kill signal ($K_{51\_36}$), and a generate signal ($G_{51\_36}$) corresponding to bit-36 through bit-51 from the third stage 145. The exemplary circuitry for the fourth stage 149 implements the equations for $C_{51\_0}$ and $C_{51\_0}'$ presented in Tables 4A and 4B. Per the equations in Tables 4A and 4B, only one of $C_{51\_0}$ and $C_{51\_0}'$ can be high at a given time. The circuitry for the fourth stage 149 takes advantage of this fact to incorporate a push-pull methodology to enhance the corresponding circuit performance.

If either $C_{51\_0}$ or $C_{51\_0}'$ is to be generated as a high signal, the corresponding signal prior to inverter 519 or 521, respectively, will be low. Similarly, if either $C_{51\_0}$ or $C_{51\_0}'$ is to be generated as a low signal, the corresponding signal prior to inverter 519 or 521, respectively, will be high. Just prior to entering the inverter 519 or 521, the low signal will cause the high signal to be pushed high (i.e., refreshed). Thus, when passing through the inverter 519 or 521, the recently refreshed high signal will be inverted to a well-defined low signal, and the low signal will inverted to a well-defined high signal. A low $C_{51\_0}$ signal prior to inverter 519 causes PMOS device 517 to refresh the high $C_{51\_0}'$ signal prior to inverter 521. A low $C_{51\_0}'$ signal prior to inverter 521 causes PMOS device 515 to refresh the high $C_{51\_0}$ signal prior to inverter 519. In this manner, the push-pull methodology is implemented to enhance the corresponding circuit performance. In other embodiments of the present invention, a plurality of PMOS devices can be implemented in a similar manner at other locations within the circuit where a pair of signals are mutually exclusive. For example, a signal at a node 510*a* is mutually exclusive with a signal at a node 510*b*. Therefore, a plurality of PMOS devices 511 and 513 can be used to implemented the push-pull methodology. A low signal prior at node 510*a* causes PMOS device 513 to refresh a high signal prior to a pass gate 512. A low signal at node 510*b* causes PMOS device 511 to refresh a high signal prior to a pass gate 514. In this manner, the low signal in the pair of signals is used to control a PMOS device configured to refresh the complementary high signal in the pair of signals.

Figure 4E:
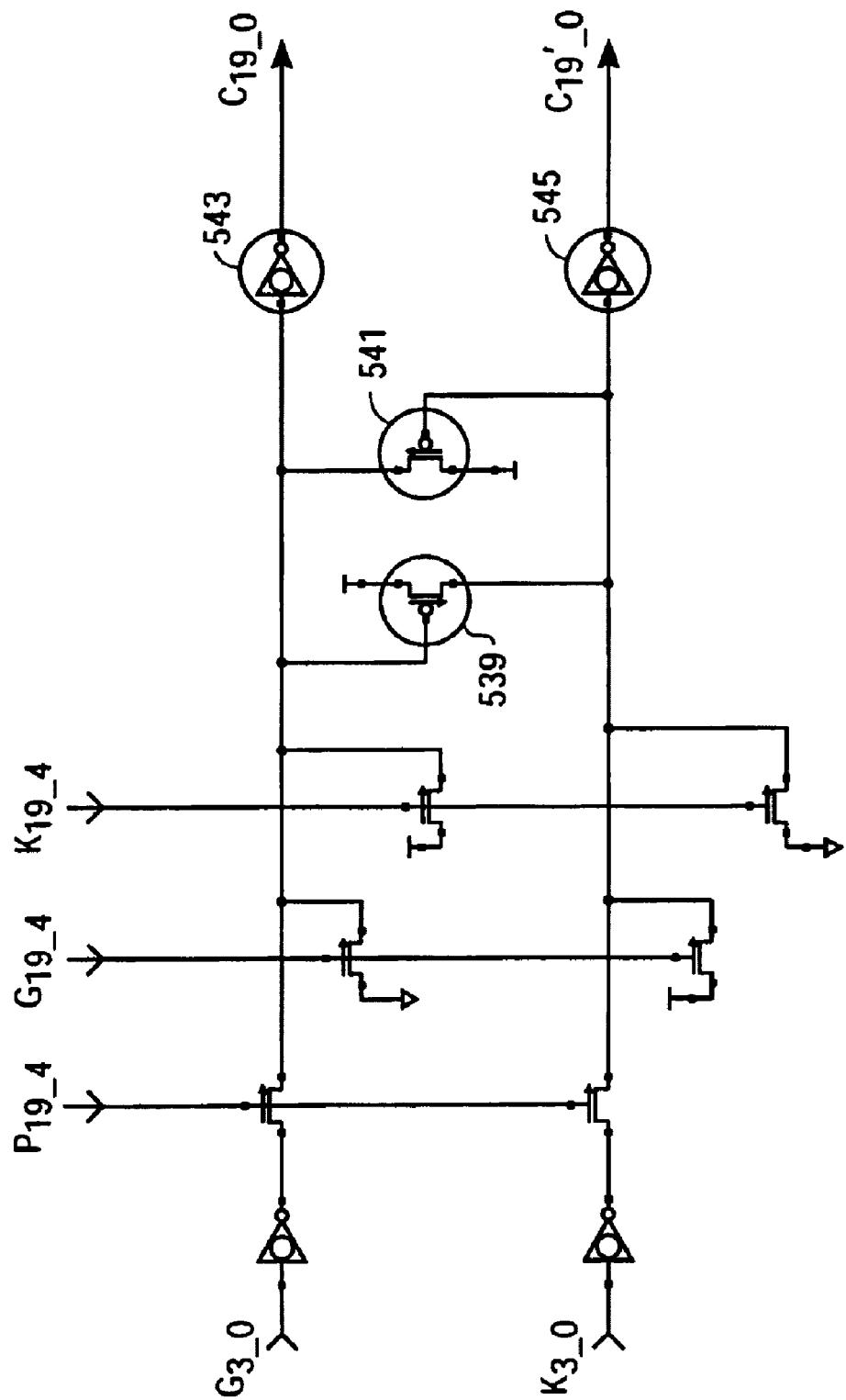
FIG. 4E is an illustration showing an exemplary circuit implementing the fourth stage of the global carry chain for creating a carry ($C_{19\_0}$) and a carry complement signal ($C_{19\_0}''$) corresponding to bit-0 through bit-19, in accordance with one embodiment of the invention.

FIG. 4E is an illustration showing an exemplary circuit implementing the fourth stage 149 of the global carry chain 101 for creating a carry ($C_{19\_0}$) and a carry complement signal ($C_{19\_0}'$) corresponding to bit-0 through bit-19, in accordance with one embodiment of the invention. The exemplary circuitry for creating $C_{19\_0}$ and $C_{19\_0}'$ receives as input a generate signal ($G_{3\_0}$) and a kill signal ($K_{3\_0}$) for bit-0 through bit-3 from the second stage 141. Also, the exemplary circuitry receives as input a propagate signal ($P_{19\_4}$), a kill signal ($K_{19\_4}$), and a generate signal ($G_{19\_4}$) corresponding to bit-4 through bit-19 from the third stage 145. The exemplary circuitry for the fourth stage 149 implements the equations for $C_{19\_0}$ and $C_{19\_0}'$ presented in Tables 4A and 4B. Per the equations in Tables 4A and 4B, only one of $C_{19\_0}$ and $C_{19\_0}'$ can be high at a given time. The circuitry for the fourth stage 149 takes advantage of this fact to incorporate a push-pull methodology to enhance the corresponding circuit performance.

If either $C_{19\_0}$ or $C_{19\_0}'$ is to be generated as a high signal, the corresponding signal prior to inverter 543 or 545, respectively, will be low. Similarly, if either $C_{19\_0}$ or $C_{19\_0}'$ is to be generated as a low signal, the corresponding signal prior to inverter 543 or 545, respectively, will be high. Just prior to entering the inverter 543 or 545, the low signal will cause the high signal to be pushed high (i.e., refreshed). Thus, when passing through the inverter 543 or 545, the recently refreshed high signal will be inverted to a well-defined low signal, and the low signal will inverted to a well-defined high signal. A low $C_{19\_0}$ signal prior to inverter 543 causes PMOS device 539 to refresh the high $C_{19\_0}'$ signal prior to inverter 545. A low $C_{19\_0}'$ signal prior to inverter 545 causes PMOS device 541 to refresh the high $C_{19\_0}$ signal prior to inverter 543. In this manner, the push-pull methodology is implemented to enhance the corresponding circuit performance.

Figure 5A:
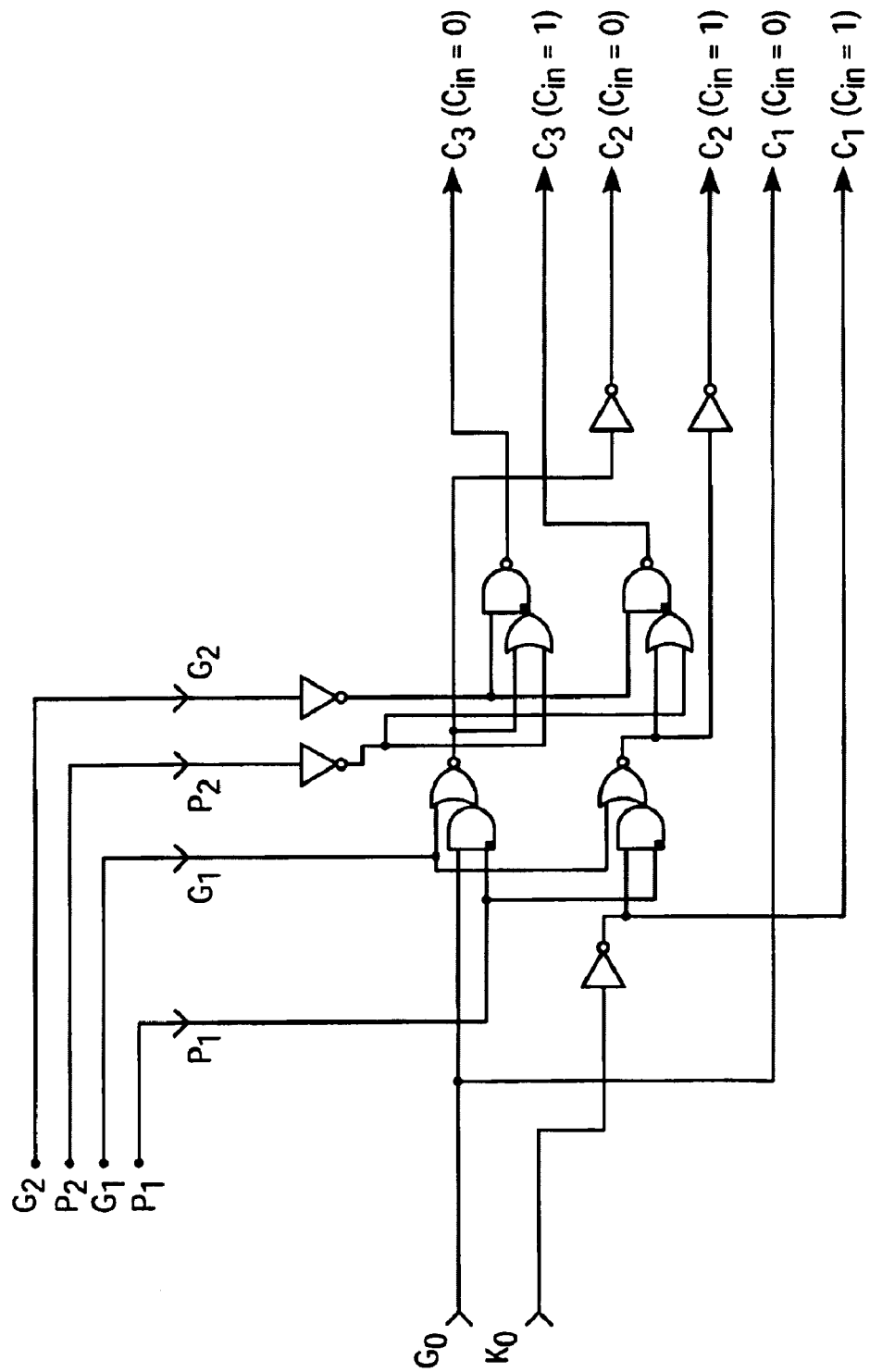
FIG. 5A is an illustration showing a first portion of an exemplary circuit implementing the local sum and sum complement generation block, in accordance with one embodiment of the invention.

FIG. 5A is an illustration showing a first portion of an exemplary circuit implementing the local sum and sum complement generation block 107, in accordance with one embodiment of the invention. The exemplary circuitry for the local sum and sum complement generation block 107 implements the equations presented in Table 5. The exemplary circuitry of FIG. 5A is shown as being implemented for bit-0 through bit-3. A similar first portion of exemplary circuitry is implemented for each four bit group corresponding to bit-i, bit-(i+1), bit-(i+2), and bit-(i+3) as shown in Table 5. The first portion of the exemplary circuitry for the local sum and sum complement generation block 107 receives as input a generate signal for bit-0 ($G_0$), a kill signal for bit-0 ($K_0$), a propagate signal for bit-1 ($P_1$), a generate signal for bit-i ($G_1$), a propagate signal for bit-2 ($P_2$), and a generate signal for bit-2 ($G_2$). Using the gate logic as shown in FIG. 5A, the first portion of the exemplary circuitry for the local sum and sum complement generation block 107 generates intermediate carries for bit-1 through bit-3 assuming that $C_{in}$ (i.e., the actual carry into bit-0) is both high ($C_{in}=1$) and low ($C_{in}=0$). Output signals $C_1$ ($C_{in}=1$) and $C_1$ ($C_{in}=0$) correspond to intermediate carries for bit-1 assuming that $C_{in}$ is high and low, respectively. Output signals $C_2$ ($C_{in}=1$) and $C_2$ ($C_{in}=0$) correspond to intermediate carries for bit-2 assuming that $C_{in}$ is high and low, respectively. Output signals $C_3$ ($C_{in}=1$) and $C_3$ ($C_{in}=0$) correspond to intermediate carries for bit-3 assuming that $C_{in}$ is high and low, respectively. The output signals $C_1$ ($C_{in}$=1), $C_1$ ($C_{in}$=0), $C_2$ ($C_{in}$=1), $C_2$ ($C_{in}$=0), $C_3$ ($C_{in}$=1), and $C_3$ ($C_{in}$=0) are provided as input to a second portion of the exemplary circuit implementing the local sum and sum complement generation block 107.

Figure 5B:
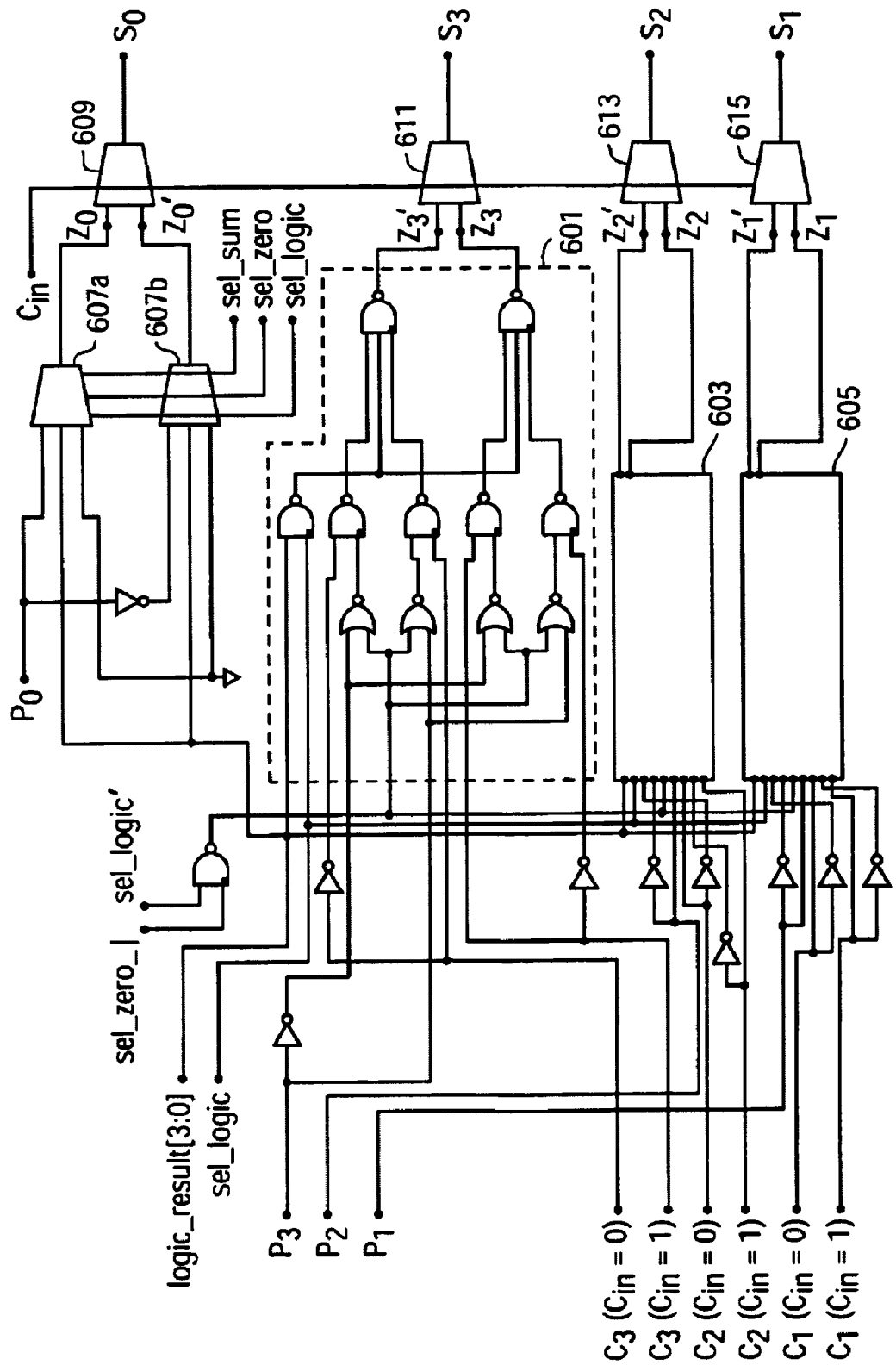
FIG. 5B is an illustration showing a second portion of the exemplary circuit implementing the local sum and sum complement generation block, in accordance with one embodiment of the invention.

FIG. 5B is an illustration showing a second portion of the exemplary circuit implementing the local sum and sum complement generation block 107, in accordance with one embodiment of the invention. The exemplary circuitry of FIG. 5B is shown as being implemented for bit-0 through bit-3. A similar second portion of exemplary circuitry is implemented for each four bit group corresponding to bit-i, bit-(i+1), bit-(i+2), and bit-(i+3) as shown in Table 5. In addition to the $C_1$ ($C_{in}$=1), $C_1$ ($C_{in}$=0), $C_2$ ($C_{in}$=1), $C_2$ ($C_{in}$=0), $C_3$ ($C_{in}$=1), and $C_3$ ($C_{in}$=0) input signals received from the first portion of exemplary circuitry, the second portion of exemplary circuitry for the local sum and sum complement generation block 107 receives as input a propagate signal for bit-0 ($P_0$), a propagate signal for bit-1 ($P_1$), a propagate signal for bit-2 ($P_2$), and a propagate signal for bit-3 ($P_3$). A sel_sum signal, a sel_zero signal, a sel_logic signal, a sel_zero__1 signal, a sel_logic' signal, and a logic_result[3:0] signal are also received as input by the second portion of exemplary circuitry for the local sum and sum complement generation block 107. The sel_sum signal is a control signal for instructing multiplexers to provide a local sum result versus a local logic result or a zero result. The sel_zero signal is a control signal for instructing multiplexers to provide a zero result versus a local sum or a local logic result. The sel_logic signal is a control signal for instructing multiplexers to provide a local logic result versus a local sum result or a zero result. The sel_zero__1 signal is the same as the sel_zero signal except that the sel_zero__1 signal is active low. The sel_logic' signal is the complement of the sel_logic signal. The logic_result[3:0] signal is actually a four bit signal carried on a four bit bus. The logic_result[3:0] signal provides a bit-wise result of a logic operation. The associated logic operation is performed outside of the circuitry shown in FIG. 5B. Multiplexers 607a, 607b, 605, 603, and 601 are used to generate local sum and sum complement signals for bit-0, bit-1, bit-2, and bit-3, respectively. The circuitry contained within multiplexers 603 and 605 is analogous to the circuitry shown within multiplexer 601. Multiplexers 607a and 607b pass the appropriate signal depending on the sel_sum, sel_zero, and sel_logic signals. Local sum and sum complement signals for bit-0 (i.e., $Z_0$ and $Z_0'$, respectively) are passed to a multiplexer 609. Local sum and sum complement signals for bit-1 (i.e., $Z_1$ and $Z_1'$, respectively) are passed to a multiplexer 615. Local sum and sum complement signals for bit-2 (i.e., $Z_2$ and $Z_2'$, respectively) are passed to a multiplexer 613. Local sum and sum complement signals for bit-3 (i.e., $Z_3$ and $Z_3'$, respectively) are passed to a multiplexer 611. The actual carry signal into bit-0 ($C_{in}$) is provided to multiplexers 609, 615, 613, and 611. If $C_{in}$ is high ($C_{in}$=1), the $Z_0$, $Z_1$, $Z_2$, and $Z_3$ signals will be passed as sum output signals $S_0$, $S_1$, $S_2$, and $S_3$, respectively. Conversely, if $C_{in}$ is low ($C_{in}$=0), the $Z_0'$, $Z_1'$, $Z_2'$, and $Z_3'$ signals will be passed as sum output signals $S_0$, $S_1$, $S_2$, and $S_3$, respectively. As previously discussed with respect to FIGS. 3A–3B, the sum output signals $S_0$, $S_1$, ..., $S_{63}$ define the final sum output.

Figure 6:
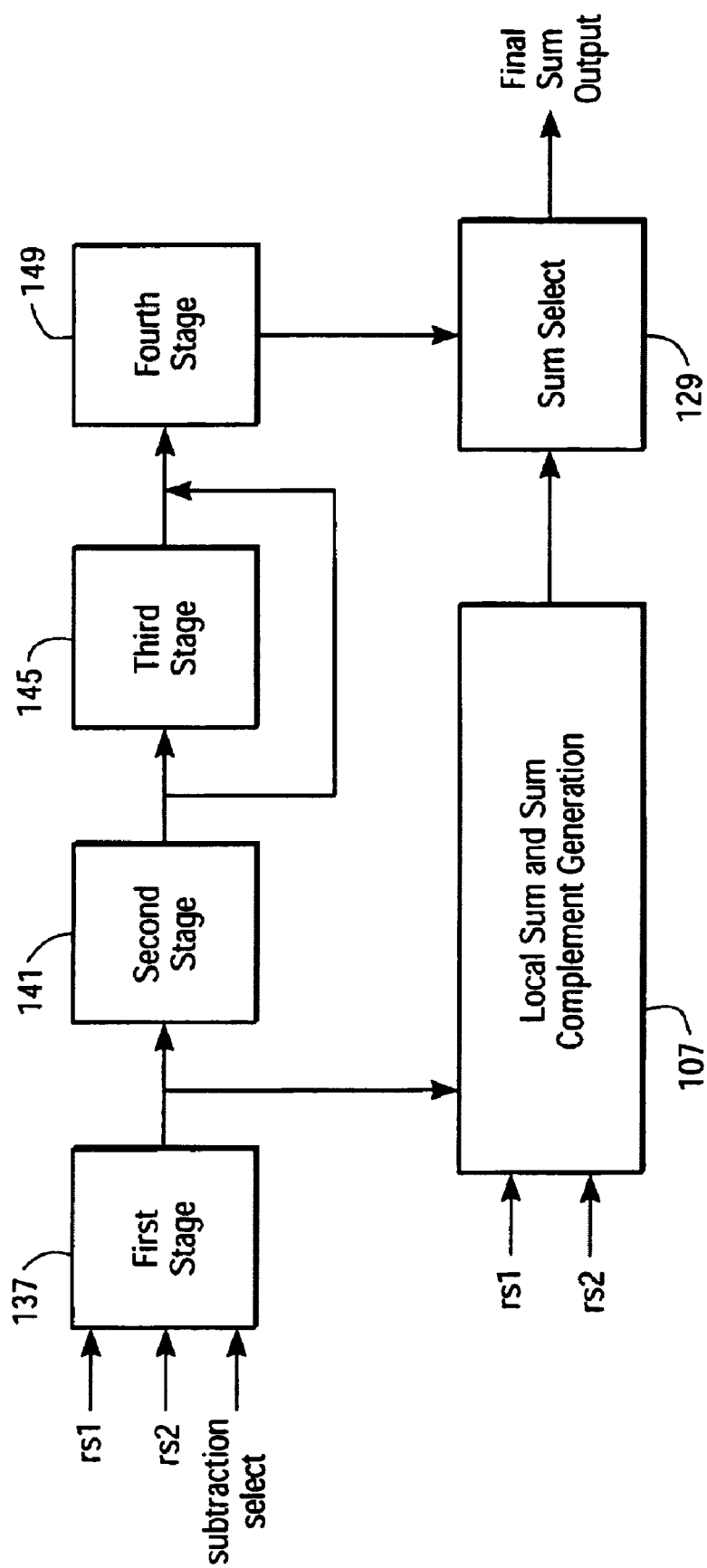
FIG. 6 is an illustration showing a critical path block diagram for the ALU including the global carry chain and the sum and logic block, in accordance with one embodiment of the invention.

FIG. 6 is an illustration showing a critical path block diagram for the ALU including the global carry chain 101 and the sum and logic block 103, in accordance with one embodiment of the invention. The critical path includes the first stage 137 receiving input rs1, rs2, and subtraction select. Output from the first stage 137 is provided to the second stage 141 along a first critical path branch. Output from the first stage 137 is also provided to the local sum and sum complement generation block 107 along a second critical path branch. Along the second critical path branch, output from the local sum and sum complement generation block 107 is provided to the sum select block 129. Along the first critical path branch, output from the second stage 141 is provided to the third stage 145. Output from the second stage 141 and third stage 145 is provided to the fourth stage 149. Output from the fourth stage 149 is then provided to the sum select block 129 which in turn provides the Final Sum Output. As shown by the equation for $C_{59\_0}$ in Table 4A, the first critical path branch, corresponding to the global carry chain 101, is governed by the generation of the $C_{59\_0}$. The critical path timing of the ALU of the present invention is generally comparable to that of an ALU implemented using dynamic circuitry and is substantially less than that of an ALU implemented using regular static circuitry.

In general, the ALU of the present invention can be implemented with a footprint area comparable to that of an ALU implemented using regular static circuitry. In following, the ALU of the present invention can be implemented with a footprint area substantially less than that of an ALU implemented using dynamic circuitry. Also, a power consumption associated with the ALU of the present invention is comparable to that of an ALU implemented using regular static circuitry. In following, the power consumption associated with the ALU of the present invention is substantially less than that of an ALU implemented using dynamic circuitry. Furthermore, since the ALU of the present invention does not rely on clocking, as is done in an ALU implemented using dynamic circuitry, the ALU of the present invention is more robust (e.g., less sensitive to noise) than an ALU implemented using dynamic circuitry.

TABLE 1

First Stage Propagate, Kill, and Generate Equations

First Stage Propagate Equations $P_i = rs1_i$ XOR $rs2_i$ XOR select
for i = 0 . . . 63
Examples: $P_0 = rs1_0$ XOR $rs2_0$ XOR select
$P_1 = rs1_1$ XOR $rs2_1$ XOR select
$P_2 = rs1_2$ XOR $rs2_2$ XOR select
.
.
.
$P_{62} = rs1_{62}$ XOR $rs2_{62}$ XOR select
$P_{63} = rs1_{63}$ XOR $rs2_{63}$ XOR select First Stage Kill Equations $K_i = rs1_i'$ AND ($rs2_i$ XNOR select)
for i = 0 . . . 63
Examples: $K_0 = rs1_0'$ AND ($rs2_0$ XNOR select)
$K_1 = rs1_1'$ AND ($rs2_1$ XNOR select)
$K_2 = rs1_2'$ AND ($rs2_2$ XNOR select)
.
.
.
$K_{62} = rs1_{62}'$ AND ($rs2_{62}$ XNOR select)
$K_{63} = rs1_{63}'$ AND ($rs2_{63}$ XNOR select)

First Stage Generate Equations $G_i = rs1_i$ AND ($rs2_i$ XOR select)
for i = 0 . . . 63
Examples: $G_0 = rs1_0$ AND ($rs2_0$ XOR select)
$G_1 = rs1_1$ AND ($rs2_1$ XOR select)
$G_2 = rs1_2$ AND ($rs2_2$ XOR select)
.
.

TABLE 1-continued

First Stage Propagate, Kill, and Generate Equations $G_{62} = rs1_{62}$ AND ($rs2_{62}$ XOR select)
$G_{63} = rs1_{63}$ AND ($rs2_{63}$ XOR select)

TABLE 2A

Second Stage Propagate Equations

Basic Second Stage Propagate (P) Equation $P_{i:j} = P_{i:m} * P_{(m-1):j}$ (applied recursively)
Second Stage Propagate Equations $P_{3\_0} = P_3 P_2 P_1 P_0$
$P_{7\_4} = P_7 P_6 P_5 P_4$
$P_{11\_8} = P_{11} P_{10} P_9 P_8$
$P_{15\_12} = P_{15} P_{14} P_{13} P_{12}$
$P_{19\_16} = P_{19} P_{18} P_{17} P_{16}$
$P_{23\_20} = P_{23} P_{22} P_{21} P_{20}$
$P_{27\_24} = P_{27} P_{26} P_{25} P_{24}$
$P_{31\_28} = P_{31} P_{30} P_{29} P_{28}$
$P_{35\_32} = P_{35} P_{34} P_{33} P_{32}$
$P_{39\_36} = P_{39} P_{38} P_{37} P_{36}$
$P_{43\_40} = P_{43} P_{42} P_{41} P_{40}$
$P_{47\_44} = P_{47} P_{46} P_{45} P_{44}$
$P_{51\_48} = P_{51} P_{50} P_{49} P_{48}$
$P_{55\_52} = P_{55} P_{54} P_{53} P_{52}$
$P_{59\_56} = P_{59} P_{58} P_{57} P_{56}$
$P_{63\_60} = P_{63} P_{62} P_{61} P_{60}$

TABLE 2B

Second Stage Kill Equations

Basic Second Stage Kill (K) Equation $K_{i:j} = K_{i:m} + K_{(m-1):j} * P_{i:m}$ (applied recursively)
Second Stage Kill Equations $K_{3\_0} = K_3 + (K_2 P_3) + (K_1 P_3 P_2) + (K_0 P_3 P_2 P_1)$
$K_{7\_4} = K_7 + (K_6 P_7) + (K_5 P_7 P_6) + (K_4 P_7 P_6 P_5)$
$K_{11\_8} = K_{11} + (K_{10} P_{11}) + (K_9 P_{11} P_{10}) + (K_8 P_{11} P_{10} P_9)$
$K_{15\_12} = K_{15} + (K_{14} P_{15}) + (K_{13} P_{15} P_{14}) + (K_{12} P_{15} P_{14} P_{13})$
$K_{19\_16} = K_{19} + (K_{18} P_{19}) + (K_{17} P_{19} P_{18}) + (K_{16} P_{19} P_{18} P_{17})$
$K_{23\_20} = K_{23} + (K_{22} P_{23}) + (K_{21} P_{23} P_{22}) + (K_{20} P_{23} P_{22} P_{21})$
$K_{27\_24} = K_{27} + (K_{26} P_{27}) + (K_{25} P_{27} P_{26}) + (K_{24} P_{27} P_{26} P_{25})$
$K_{31\_28} = K_{31} + (K_{30} P_{31}) + (K_{29} P_{31} P_{30}) + (K_{28} P_{31} P_{30} P_{29})$
$K_{35\_32} = K_{35} + (K_{34} P_{35}) + (K_{33} P_{35} P_{34}) + (K_{32} P_{35} P_{34} P_{33})$
$K_{39\_36} = K_{39} + (K_{38} P_{39}) + (K_{37} P_{39} P_{38}) + (K_{36} P_{39} P_{38} P_{37})$
$K_{43\_40} = K_{43} + (K_{42} P_{43}) + (K_{41} P_{43} P_{42}) + (K_{40} P_{43} P_{42} P_{41})$
$K_{47\_44} = K_{47} + (K_{46} P_{47}) + (K_{45} P_{47} P_{46}) + (K_{44} P_{47} P_{46} P_{45})$
$K_{51\_48} = K_{51} + (K_{50} P_{51}) + (K_{49} P_{51} P_{50}) + (K_{48} P_{51} P_{50} P_{49})$
$K_{55\_52} = K_{55} + (K_{54} P_{55}) + (K_{53} P_{55} P_{54}) + (K_{52} P_{55} P_{54} P_{53})$
$K_{59\_56} = K_{59} + (K_{58} P_{59}) + (K_{57} P_{59} P_{58}) + (K_{56} P_{59} P_{58} P_{57})$

TABLE 2C

Second Stage Generate Equations

Basic Second Stage Generate (G) Equation $G_{i:j} = G_{i:m} + G_{(m-1):j} * P_{i:m}$ (applied recursively)
Second Stage Generate Equations $G_{3\_0} = G_3 + (G_2 P_3) + (G_1 P_3 P_2) + (G_0 P_3 P_2 P_1)$
$G_{7\_4} = G_7 + (G_6 P_7) + (G_5 P_7 P_6) + (G_4 P_7 P_6 P_5)$
$G_{11\_8} = G_{11} + (G_{10} P_{11}) + (G_9 P_{11} P_{10}) + (G_8 P_{11} P_{10} P_9)$
$G_{15\_12} = G_{15} + (G_{14} P_{15}) + (G_{13} P_{15} P_{14}) + (G_{12} P_{15} P_{14} P_{13})$
$G_{19\_16} = G_{19} + (G_{18} P_{19}) + (G_{17} P_{19} P_{18}) + (G_{16} P_{19} P_{18} P_{17})$
$G_{23\_20} = G_{23} + (G_{22} P_{23}) + (G_{21} P_{23} P_{22}) + (G_{20} P_{23} P_{22} P_{21})$

TABLE 2C-continued

Second Stage Generate Equations $G_{27\_24} = G_{27} + (G_{26} P_{27}) + (G_{25} P_{27} P_{26}) + (G_{24} P_{27} P_{26} P_{25})$
$G_{31\_28} = G_{31} + (G_{30} P_{31}) + (G_{29} P_{31} P_{30}) + (G_{28} P_{31} P_{30} P_{29})$
$G_{35\_32} = G_{35} + (G_{34} P_{35}) + (G_{33} P_{35} P_{34}) + (G_{32} P_{35} P_{34} P_{33})$
$G_{39\_36} = G_{39} + (G_{38} P_{39}) + (G_{37} P_{39} P_{38}) + (G_{36} P_{39} P_{38} P_{37})$
$G_{43\_40} = G_{43} + (G_{42} P_{43}) + (G_{41} P_{43} P_{42}) + (G_{40} P_{43} P_{42} P_{41})$
$G_{47\_44} = G_{47} + (G_{46} P_{47}) + (G_{45} P_{47} P_{46}) + (G_{44} P_{47} P_{46} P_{45})$
$G_{51\_48} = G_{51} + (G_{50} P_{51}) + (G_{49} P_{51} P_{50}) + (G_{48} P_{51} P_{50} P_{49})$
$G_{55\_52} = G_{55} + (G_{54} P_{55}) + (G_{53} P_{55} P_{54}) + (G_{52} P_{55} P_{54} P_{53})$
$G_{59\_56} = G_{59} + (G_{58} P_{59}) + (G_{57} P_{59} P_{58}) + (G_{56} P_{59} P_{58} P_{57})$
$G_{63\_60} = G_{63} + (G_{62} P_{63}) + (G_{61} P_{63} P_{62}) + (G_{60} P_{63} P_{62} P_{61})$

TABLE 3A

Third Stage Propagate Equations

Basic Third Stage Propagate (P) Equation $P_{i:j} = P_{i:m} * P_{(m-1):j}$ (applied recursively)
Third Stage Propagate Equations $P_{15\_0} = P_{15\_12} P_{11\_8} P_{7\_4} P_{3\_0}$
$P_{19\_4} = P_{19\_16} P_{15\_12} P_{11\_8} P_{7\_4}$
$P_{23\_8} = P_{23\_20} P_{19\_16} P_{15\_12} P_{11\_8}$
$P_{27\_12} = P_{27\_24} P_{23\_20} P_{19\_16} P_{15\_12}$
$P_{31\_36} = P_{31\_28} P_{27\_24} P_{23\_20} P_{19\_16}$
$P_{35\_20} = P_{35\_32} P_{31\_28} P_{27\_24} P_{23\_20}$
$P_{39\_24} = P_{39\_36} P_{35\_32} P_{31\_28} P_{27\_24}$
$P_{43\_28} = P_{43\_40} P_{39\_36} P_{35\_32} P_{31\_28}$
$P_{47\_32} = P_{47\_44} P_{43\_40} P_{39\_36} P_{35\_32}$
$P_{51\_36} = P_{51\_48} P_{47\_44} P_{43\_40} P_{39\_36}$
$P_{55\_40} = P_{55\_52} P_{51\_48} P_{47\_44} P_{43\_40}$
$P_{59\_44} = P_{59\_56} P_{55\_52} P_{51\_48} P_{47\_44}$
$P_{63\_48} = P_{63\_60} P_{59\_56} P_{55\_52} P_{51\_48}$

TABLE 3B

Third Stage Kill Equations

Basic Third Stage Kill (K) Equation $K_{i:j} = K_{i:m} + K_{(m-1):j} * P_{i:m}$ (applied recursively)
Third Stage Kill Equations $K_{15\_0} = K_{15\_12} + (K_{11\_8} P_{15\_12}) + (K_{7\_4} P_{15\_12} P_{11\_8}) + (K_{3\_0} P_{15\_12} P_{11\_8} P_{7\_4})$
$K_{19\_4} = K_{19\_16} + (K_{15\_12} P_{19\_16}) + (K_{11\_8} P_{19\_16} P_{15\_12}) + (K_{7\_4} P_{19\_16} P_{15\_12} P_{11\_8})$
$K_{23\_8} = K_{23\_20} + (K_{19\_16} P_{23\_20}) + (K_{15\_12} P_{23\_20} P_{19\_16}) + (K_{11\_8} P_{23\_20} P_{19\_16} P_{15\_12})$
$K_{27\_12} = K_{27\_24} + (K_{23\_20} P_{27\_24}) + (K_{19\_16} P_{27\_24} P_{23\_20}) + (K_{15\_12} P_{27\_24} P_{23\_20} P_{19\_16})$
$K_{31\_16} = K_{31\_28} + (K_{27\_24} P_{31\_28}) + (K_{23\_20} P_{31\_28} P_{27\_24}) + (K_{19\_16} P_{31\_28} P_{27\_24} P_{23\_20})$
$K_{35\_20} = K_{35\_32} + (K_{31\_28} P_{35\_32}) + (K_{27\_24} P_{35\_32} P_{31\_28}) + (K_{23\_20} P_{35\_32} P_{31\_28} P_{27\_24})$
$K_{39\_24} = K_{39\_36} + (K_{35\_32} P_{39\_36}) + (K_{31\_28} P_{39\_36} P_{35\_32}) + (K_{27\_24} P_{39\_36} P_{35\_32} P_{31\_28})$
$K_{43\_28} = K_{43\_40} + (K_{39\_36} P_{43\_40}) + (K_{35\_32} P_{43\_40} P_{39\_36}) + (K_{31\_28} P_{43\_40} P_{39\_36} P_{35\_32})$
$K_{47\_32} = K_{47\_44} + (K_{43\_40} P_{47\_44}) + (K_{39\_36} P_{47\_44} P_{43\_40}) + (K_{35\_32} P_{47\_44} P_{43\_40} P_{39\_36})$
$K_{51\_36} = K_{51\_48} + (K_{47\_44} P_{51\_48}) + (K_{43\_40} P_{51\_48} P_{47\_44}) + (K_{39\_36} P_{51\_48} P_{47\_44} P_{43\_40})$
$K_{55\_40} = K_{55\_52} + (K_{51\_48} P_{55\_52}) + (K_{47\_44} P_{55\_52} P_{51\_48}) + (K_{43\_40} P_{55\_52} P_{51\_48} P_{47\_44})$
$K_{59\_44} = K_{59\_56} + (K_{55\_52} P_{59\_56}) + (K_{51\_48} P_{59\_56} P_{55\_52}) + (K_{47\_44} P_{59\_56} P_{55\_52} P_{51\_48})$
$K_{63\_48} = K_{63\_60} + (K_{59\_56} P_{63\_60}) + (K_{55\_52} P_{63\_60} P_{59\_56}) + (K_{51\_48} P_{63\_60} P_{59\_56} P_{55\_52})$

TABLE 3C

Third Stage Generate Equations

Basic Third Stage Generate (G) Equation $G_{i:j} = G_{i:m} + G_{(m-1):j} * P_{i:m}$ (applied recursively)
Third Stage Generate Equations $G_{15\_0} = G_{15\_12} + (G_{11\_8} P_{15\_12}) + (G_{7\_4} P_{15\_12} P_{11\_8}) + (G_{3\_0} P_{15\_12} P_{11\_8} P_{7\_4})$
$G_{19\_4} = G_{19\_16} + (G_{15\_12} P_{19\_16}) + (G_{11\_8} P_{19\_16} P_{15\_12}) + (G_{7\_4} P_{19\_16} P_{15\_12} P_{11\_8})$
$G_{23\_8} = G_{23\_20} + (G_{19\_16} P_{23\_20}) + (G_{15\_12} P_{23\_20} P_{19\_16}) + (G_{11\_8} P_{23\_20} P_{19\_16} P_{15\_12})$
$G_{27\_12} = G_{27\_24} + (G_{23\_20} P_{27\_24}) + (G_{19\_16} P_{27\_24} P_{23\_20}) + (G_{15\_12} P_{27\_24} P_{23\_20} P_{19\_16})$
$G_{31\_16} = G_{31\_28} + (G_{27\_24} P_{31\_28}) + (G_{23\_20} P_{31\_28} P_{27\_24}) + (G_{19\_16} P_{31\_28} P_{27\_24} P_{23\_20})$
$G_{35\_20} = G_{35\_32} + (G_{31\_28} P_{35\_32}) + (G_{27\_24} P_{35\_32} P_{31\_28}) + (G_{23\_20} P_{35\_32} P_{31\_28} P_{27\_24})$
$G_{39\_24} = G_{39\_36} + (G_{35\_32} P_{39\_36}) + (G_{31\_28} P_{39\_36} P_{35\_32}) + (G_{27\_24} P_{39\_36} P_{35\_32} P_{31\_28})$
$G_{43\_28} = G_{43\_40} + (G_{39\_36} P_{43\_40}) + (G_{35\_32} P_{43\_40} P_{39\_36}) + (G_{31\_28} P_{43\_40} P_{39\_36} P_{35\_32})$
$G_{47\_32} = G_{47\_44} + (G_{43\_40} P_{47\_44}) + (G_{39\_36} P_{47\_44} P_{43\_40}) + (G_{35\_32} P_{47\_44} P_{43\_40} P_{39\_36})$
$G_{51\_36} = G_{51\_48} + (G_{47\_44} P_{51\_48}) + (G_{43\_40} P_{51\_48} P_{47\_44}) + (G_{39\_36} P_{51\_48} P_{47\_44} P_{43\_40})$
$G_{55\_40} = G_{55\_52} + (G_{51\_48} P_{55\_52}) + (G_{47\_44} P_{55\_52} P_{51\_48}) + (G_{43\_40} P_{55\_52} P_{51\_48} P_{47\_44})$
$G_{59\_44} = G_{59\_56} + (G_{55\_52} P_{59\_56}) + (G_{51\_48} P_{59\_56} P_{55\_52}) + (G_{47\_44} P_{59\_56} P_{55\_52} P_{51\_48})$
$G_{63\_48} = G_{63\_60} + (G_{59\_56} P_{63\_60}) + (G_{55\_52} P_{63\_60} P_{59\_56}) + (G_{51\_48} P_{63\_60} P_{59\_56} P_{55\_52})$

TABLE 4A

Fourth Stage Carry Equations

Basic Fourth Stage Carry (C) Equation $C_i = G_i + C_{i-1} * P_i$ (applied recursively)
Carry Equation for Each Fourth Bit Using Global Carry Chain $C_{3\_0} = G_{3\_0}$
$C_{7\_0} = G_{7\_4} + (G_{3\_0} P_{7\_4})$
$C_{11\_0} = G_{11\_8} + (G_{7\_4} P_{11\_8}) + (G_{3\_0} P_{11\_8} P_{7\_4})$
$C_{15\_0} = G_{15\_0}$
$C_{19\_0} = G_{19\_4} + (G_{3\_0} P_{19\_4})$
$C_{23\_0} = G_{23\_8} + (G_{7\_4} P_{23\_8}) + (G_{3\_0} P_{23\_8} P_{7\_4})$
$C_{27\_0} = G_{27\_12} + (G_{11\_8} P_{27\_12}) + (G_{7\_4} P_{27\_12} P_{11\_8}) + (G_{3\_0} P_{27\_12} P_{11\_8} P_{7\_4})$
$C_{31\_0} = G_{31\_16} + (G_{15\_0} P_{31\_16})$
$C_{35\_0} = G_{35\_20} + (G_{19\_4} P_{35\_20}) + (G_{3\_0} P_{35\_20} P_{19\_4})$
$C_{39\_0} = G_{39\_24} + (G_{23\_8} P_{39\_24}) + (G_{7\_4} P_{39\_24} P_{23\_8}) + (G_{3\_0} P_{39\_24} P_{23\_8} P_{7\_4})$
$C_{43\_0} = G_{43\_28} + (G_{27\_12} P_{43\_28}) + (G_{11\_8} P_{43\_28} P_{27\_12}) + (G_{7\_4} P_{43\_28} P_{27\_12} P_{11\_8}) + (G_{3\_0} P_{43\_28} P_{27\_12} P_{11\_8} P_{7\_4})$
$C_{47\_0} = G_{47\_32} + (G_{31\_16} P_{47\_32}) + (G_{15\_0} P_{47\_32} P_{31\_16})$
$C_{51\_0} = G_{51\_36} + (G_{35\_20} P_{51\_36}) + (G_{19\_4} P_{51\_36} P_{35\_20}) + (G_{3\_0} P_{51\_36} P_{35\_20} P_{19\_4})$
$C_{55\_0} = G_{55\_40} + (G_{39\_24} P_{55\_40}) + (G_{23\_8} P_{55\_40} P_{39\_24}) + (G_{7\_4} P_{55\_40} P_{39\_24} P_{23\_8}) + (G_{3\_0} P_{55\_40} P_{39\_24} P_{23\_8} P_{7\_4})$
$C_{59\_0} = G_{59\_44} + (G_{43\_28} P_{59\_44}) + (G_{27\_12} P_{59\_44} P_{43\_28}) + (G_{11\_8} P_{59\_44} P_{43\_28} P_{27\_12}) + (G_{7\_4} P_{59\_44} P_{43\_28} P_{27\_12} P_{11\_8}) + (G_{3\_0} P_{59\_44} P_{43\_28} P_{27\_12} P_{11\_8} P_{7\_4})$
$C_{63\_0} = G_{63\_48} + (G_{47\_32} P_{63\_48}) + (G_{31\_16} P_{63\_48} P_{47\_32}) + (G_{15\_0} P_{63\_48} P_{47\_32} P_{31\_16})$

TABLE 4B

Fourth Stage Carry Complement Equations

Basic Fourth Stage Carry Complement (C') Equation $C_i' = K_i + C_{i-1}' * P_i$ (applied recursively)
Carry Complement Equation for Each Fourth Bit Using Global Carry Chain $C_{3\_0}' = K_{3\_0}$
$C_{7\_0}' = K_{7\_4} + (K_{3\_0} P_{7\_4})$
$C_{11\_0}' = K_{11\_8} + (K_{7\_4} P_{11\_8}) + (K_{3\_0} P_{11\_8} P_{7\_4})$
$C_{15\_0}' = K_{15\_0}$
$C_{19\_0}' = K_{19\_4} + (K_{3\_0} P_{19\_4})$
$C_{23\_0}' = K_{23\_8} + (K_{7\_4} P_{23\_8}) + (K_{3\_0} P_{23\_8} P_{7\_4})$
$C_{27\_0}' = K_{27\_12} + (K_{11\_8} P_{27\_12}) + (K_{7\_4} P_{27\_12} P_{11\_8}) + (K_{3\_0} P_{27\_12} P_{11\_8} P_{7\_4})$
$C_{31\_0}' = K_{31\_16} + (K_{15\_0} P_{31\_16})$
$C_{35\_0}' = K_{35\_20} + (K_{19\_4} P_{35\_20}) + (K_{3\_0} P_{35\_20} P_{19\_4})$
$C_{39\_0}' = K_{39\_24} + (K_{23\_8} P_{39\_24}) + (K_{7\_4} P_{39\_24} P_{23\_8}) + (K_{3\_0} P_{39\_24} P_{23\_8} P_{7\_4})$
$C_{43\_0}' = K_{43\_28} + (K_{27\_12} P_{43\_28}) + (K_{11\_8} P_{43\_28} P_{27\_12}) + (K_{7\_4} P_{43\_28} P_{27\_12} P_{11\_8}) + (K_{3\_0} P_{43\_28} P_{27\_12} P_{11\_8} P_{7\_4})$
$C_{47\_0}' = K_{47\_32} + (K_{31\_16} P_{47\_32}) + (K_{15\_0} P_{47\_32} P_{31\_16})$
$C_{51\_0}' = K_{51\_36} + (K_{35\_20} P_{51\_36}) + (K_{19\_4} P_{51\_36} P_{35\_20}) + (K_{3\_0} P_{51\_36} P_{35\_20} P_{19\_4})$
$C_{55\_0}' = K_{55\_40} + (K_{39\_24} P_{55\_40}) + (K_{23\_8} P_{55\_40} P_{39\_24}) + (K_{7\_4} P_{55\_40} P_{39\_24} P_{23\_8}) + (K_{3\_0} P_{55\_40} P_{39\_24} P_{23\_8} P_{7\_4})$
$C_{59\_0}' = K_{59\_44} + (K_{43\_28} P_{59\_44}) + (K_{27\_12} P_{59\_44} P_{43\_28}) + (K_{11\_8} P_{59\_44} P_{43\_28} P_{27\_12}) + (K_{7\_4} P_{59\_44} P_{43\_28} P_{27\_12} P_{11\_8}) + (K_{3\_0} P_{59\_44} P_{43\_28} P_{27\_12} P_{11\_8} P_{7\_4})$
$C_{63\_0}' = K_{63\_48} + (K_{47\_32} P_{63\_48}) + (K_{31\_16} P_{63\_48} P_{47\_32}) + (K_{15\_0} P_{63\_48} P_{47\_32} P_{31\_16})$

TABLE 5

Local Sum Equations
Four-bit Local Sum (Z) Equations $Z_i = P_i \text{ XOR } C_{in}$
$Z_{i+1} = P_{i+1} \text{ XOR } (G_i + P_i C_{in})$
$Z_{i+2} = P_{i+2} \text{ XOR } (G_{i+1} + P_{i+1} G_i + P_i P_{i+1} C_{in})$
$Z_{i+3} = P_{i+3} \text{ XOR } (G_{i+2} + P_{i+2} G_{i+1} +$
$P_{i+2} P_{i+1} G_i + P_i P_{i+1} P_{i+2} C_{in})$
$C_{in} = 1$ for $Z_i, Z_{i+1}, Z_{i+2},$ and $Z_{i+3}$
$C_{in} = 0$ for $Z_i', Z_{i+1}', Z_{i+2}',$ and $Z_{i+3}'$
$i = \{0, 4, 8, 12, 16, 20, 24, 28, 32, 36, 40, 44, 48, 52, 56, 60\}$ While this invention has been described in terms of several embodiments, it will be appreciated that those skilled in the art upon reading the preceding specifications and studying the drawings will realize various alterations, additions, permutations and equivalents thereof. It is therefore intended that the present invention includes all such alterations, additions, permutations, and equivalents as fall within the true spirit and scope of the invention.

What is claimed is:

1. Arithmetic logic processing circuitry, comprising:
    a global carry chain implementing static propagate, kill, and generate circuitry, including,
        a first stage for generating first propagate, kill, and generate signals for each bit of a pair of multi-bit signal vectors;
        a second stage for generating second propagate, kill, and generate signals for a first group of the first propagate, kill, and generate signals;
        a third stage for generating third propagate, kill, and generate signals for a first group of the second propagate, kill, and generate signals; and a fourth stage for generating carry signals and carry complement signals, the fourth stage receiving inputs from each of the second stage and the third stage, the carry signals and the carry complement signals being useful for generating a sum result.

2. Arithmetic logic processing circuitry as recited in claim 1, wherein the second stage generates second propagate, kill, and generate signals for a plurality of groups of the first propagate, kill, and generate signals, the plurality of groups includes the first group of the first propagate, kill, and generate signals.

3. Arithmetic logic processing circuitry as recited in claim 2, wherein each of the plurality of groups of the first propagate, kill, and generate signals corresponds to a group of four bits of the pair of multi-bit signal vectors.

4. Arithmetic logic processing circuitry as recited in claim 1, wherein the third stage generates third propagate, kill, and generate signals for a plurality of groups of the second propagate, kill, and generate signals, the plurality of groups includes the first group of the second propagate, kill, and generate signals.

5. Arithmetic logic processing circuitry as recited in claim 4, wherein each group of the plurality of groups includes a number of successive second propagate, kill, and generate signals, the first group defined by the number of successive second propagate, kill, and generate signals, and groups after the first group defined by the number of successive second propagate, kill, and generate signals, wherein a first of the number of successive second propagate, kill, and generate signals within each group after the first group is a second of the number of successive second propagate, kill, and generate signals in an immediately preceding group.

6. Arithmetic logic processing circuitry as recited in claim 5, wherein each group of the plurality of groups includes four successive second propagate, kill, and generate signals.

7. Arithmetic logic processing circuitry as recited in claim 1, wherein the fourth stage is configured to generate carry signals and carry complement signals for each fourth bit in the pair of multi-bit signal vectors, wherein each of the carry signals and carry complement signals propagate from a bit-zero in the pair of multi-bit signal vectors.

8. Arithmetic logic processing circuitry as recited in claim 1, further comprising:
a summation processing circuit for receiving the first propagate, kill, and generate signals from the first stage, the first propagate, kill, and generate signals being processed to create sum and sum complement signals for each bit represented by the first propagate, kill, and generate signals, the summation processing circuit further being configured to fold the sum and sum complement signals with the carry signals to produce a final sum output signal vector.

9. Arithmetic logic processing circuitry as recited in claim 8, wherein the summation processing circuit is configured to create sum and sum complement signals for a plurality of groups of four bits, wherein the plurality of groups of four bits include each bit represented by the first propagate, kill, and generate signals.

10. Arithmetic logic processing circuitry as recited in claim 9, wherein the fourth stage is configured to generate carry signals for each fourth bit in the pair of multi-bit signal vectors, wherein each of the carry signals propagate from a bit-zero in the pair of multi-bit signal vectors, the summation processing circuit being configured to fold the carry signals for each fourth bit with the sum and sum complement signals for a corresponding group of four bits within the plurality of groups of four bits.

11. Arithmetic logic processing circuitry as recited in claim 1, wherein the first stage is configured to receive a subtraction select signal, the first stage being configured to use the subtraction select signal to invert each bit of a second multi-bit signal vector within the pair of multi-bit signal vectors, wherein inversion of each bit of the second multi-bit signal vector causes the sum result to represent a subtraction result.

12. Arithmetic logic processing circuitry as recited in claim 1, wherein the global carry chain implementing static propagate, kill, and generate circuitry is further configured to implement push-pull circuitry at locations where a pair of signals are mutually exclusive, the push-pull circuitry being configured to use a first signal in the pair of signals to control refresh circuitry configured to refresh a second signal in the pair of signals.

13. Arithmetic logic processing circuitry as recited in claim 12, wherein the first signal is a low signal, the refresh circuitry is a PMOS device, and the second signal is a high signal.

14. A method for making arithmetic logic processing circuitry, comprising:
implementing a global carry chain using static propagate, kill, and generate circuitry, including,
implementing a first stage for generating first propagate, kill, and generate signals for each bit of a pair of multi-bit signal vectors;
implementing a second stage for generating second propagate, kill, and generate signals for a first group of the first propagate, kill, and generate signals;
implementing a third stage for generating third propagate, kill, and generate signals for a first group of the second propagate, kill, and generate signals; and
implementing a fourth stage for generating carry signals and carry complement signals, the fourth stage receiving inputs from each of the second stage and the third stage, the carry signals and the carry complement signals being useful for generating a sum result.

15. A method for making arithmetic logic processing circuitry as recited in claim 14, wherein implementing the second stage generates second propagate, kill, and generate signals for a plurality of groups of the first propagate, kill, and generate signals, the plurality of groups including the first group of the first propagate, kill, and generate signals.

16. A method for making arithmetic logic processing circuitry as recited in claim 15, wherein each of the plurality of groups of the first propagate, kill, and generate signals corresponds to a group of four bits of the pair of multi-bit signal vectors.

17. A method for making arithmetic logic processing circuitry as recited in claim 14, wherein implementing the third stage generates third propagate, kill, and generate signals for a plurality of groups of the second propagate, kill, and generate signals, the plurality of groups including the first group of the second propagate, kill, and generate signals.

18. A method for making arithmetic logic processing circuitry as recited in claim 17, wherein each group of the plurality of groups includes a number of successive second propagate, kill, and generate signals, the first group defined by the number of successive second propagate, kill, and generate signals, and groups after the first group defined by the number of successive second propagate, kill, and generate signals, wherein a first of the number of successive second propagate, kill, and generate signals within each group after the first group is a second of the number of successive second propagate, kill, and generate signals in an immediately preceding group.

19. A method for making arithmetic logic processing circuitry as recited in claim 18, wherein each group of the plurality of groups includes four successive second propagate, kill, and generate signals.

20. A method for making arithmetic logic processing circuitry as recited in claim 14, wherein implementing the fourth stage is performed to generate carry signals and carry complement signals for each fourth bit in the pair of multi-bit signal vectors, wherein each of the carry signals and carry complement signals propagate from a bit-zero in the pair of multi-bit signal vectors.

21. A method for making arithmetic logic processing circuitry as recited in claim 14, further comprising:
implementing a summation processing circuit for receiving the first propagate, kill, and generate signals from the first stage, the first propagate, kill, and generate signals being processed to create sum and sum complement signals for each bit represented by the first propagate, kill, and generate signals, the summation processing circuit being further implemented to fold the sum and sum complement signals with the carry signals to produce a final sum output signal vector.

22. A method for making arithmetic logic processing circuitry as recited in claim 21, wherein implementing the summation processing circuit is performed to create sum and sum complement signals for a plurality of groups of four bits, wherein the plurality of groups of four bits include each bit represented by the first propagate, kill, and generate signals.

23. A method for making arithmetic logic processing circuitry as recited in claim 22, wherein implementing the fourth stage is performed to generate carry signals for each fourth bit in the pair of multi-bit signal vectors, wherein each of the carry signals propagate from a bit-zero in the pair of multi-bit signal vectors, the summation processing circuit being further implemented to fold the carry signals for each fourth bit with the sum and sum complement signals for a corresponding group of four bits within the plurality of groups of four bits.

24. A method for making arithmetic logic processing circuitry as recited in claim 14, wherein implementing the first stage is performed to receive a subtraction select signal, implementing the first stage being performed to use the subtraction select signal to invert each bit of a second multi-bit signal vector within the pair of multi-bit signal vectors, wherein inversion of each bit of the second multi-bit signal vector causes the sum result to represent a subtraction result.

25. A method for making arithmetic logic processing circuitry as recited in claim 14, wherein implementing the global carry chain using static propagate, kill, and generate circuitry is further performed by implementing push-pull circuitry at locations where a pair of signals are mutually exclusive, the push-pull circuitry being implemented to use a first signal in the pair of signals to control refresh circuitry configured to refresh a second signal in the pair of signals.

26. A method for making arithmetic logic processing circuitry as recited in claim 25, wherein the first signal is a low signal, the refresh circuitry is a PMOS device, and the second signal is a high signal.

27. Arithmetic logic unit circuitry, comprising:
a four-stage global carry chain implementing static propagate, kill, and generate circuitry for generating carry signals associated with a pair of multi-bit signal vectors, the carry signals being useful for generating a sum result for the pair of multi-bit signal vectors, wherein the carry signals include intermediate fourth-bit carry signals; and
a summation processing circuit for creating sum and sum complement signals for each bit in the pair of multi-bit signal vectors, the summation processing circuit configured to generate local fourth-bit sum and sum complement signals, the summation processing circuit further configured to fold the local fourth-bit sum and sum complement signals with the intermediate fourth-bit carry signals to produce a final sum output signal vector.

28. Arithmetic logic unit circuitry as recited in claim 27, wherein the four-stage global carry chain comprises:
a first stage for generating first propagate, kill, and generate signals for each bit of the pair of multi-bit signal vectors;
a second stage for generating second propagate, kill, and generate signals for a first group of the first propagate, kill, and generate signals;
a third stage for generating third propagate, kill, and generate signals for a first group of the second propagate, kill, and generate signals; and
a fourth stage for generating carry signals and carry complement signals, the fourth stage receiving inputs from each of the second stage and the third stage, the carry signals and the carry complement signals being useful for generating the sum result.

29. Arithmetic logic unit circuitry as recited in claim 28, wherein the second stage generates second propagate, kill, and generate signals for a plurality of groups of the first propagate, kill, and generate signals, the plurality of groups includes the first group of the first propagate, kill, and generate signals.

30. Arithmetic logic unit circuitry as recited in claim 29, wherein each of the plurality of groups of the first propagate, kill, and generate signals corresponds to a group of four bits of the pair of multi-bit signal vectors.

31. Arithmetic logic unit circuitry as recited in claim 28, wherein the third stage generates third propagate, kill, and generate signals for a plurality of groups of the second propagate, kill, and generate signals, the plurality of groups includes the first group of the second propagate, kill, and generate signals.

32. Arithmetic logic unit circuitry as recited in claim 31, wherein each group of the plurality of groups includes a number of successive second propagate, kill, and generate signals, the first group defined by the number of successive second propagate, kill, and generate signals, and groups after the first group defined by the number of successive second propagate, kill, and generate signals, wherein a first of the number of successive second propagate, kill, and generate signals within each group after the first group is a second of the number of successive second propagate, kill, and generate signals in an immediately preceding group.

33. Arithmetic logic unit circuitry as recited in claim 32, wherein each group of the plurality of groups includes four successive second propagate, kill, and generate signals.

34. Arithmetic logic unit circuitry as recited in claim 28, wherein the fourth stage is configured to generate carry signals and carry complement signals for each fourth bit in the pair of multi-bit signal vectors, wherein each of the carry signals and carry complement signals propagate from a bit-zero in the pair of multi-bit signal vectors.

35. Arithmetic logic unit circuitry as recited in claim 28, wherein the summation processing circuit is configured to receive the first propagate, kill, and generate signals from the first stage, the first propagate, kill, and generate signals being processed to create sum and sum complement signals for each bit represented by the first propagate, kill, and generate signals.

36. Arithmetic logic unit circuitry as recited in claim 28, wherein the summation processing circuit is configured to create sum and sum complement signals for a plurality of groups of four bits, wherein the plurality of groups of four bits include each bit represented by the first propagate, kill, and generate signals.

37. Arithmetic logic unit circuitry as recited in claim 36, wherein the fourth stage is configured to generate carry signals for each fourth bit in the pair of multi-bit signal vectors, wherein each of the carry signals propagate from a bit-zero in the pair of multi-bit signal vectors, the summation processing circuit being configured to fold the carry signals for each fourth bit with the sum and sum complement signals for a corresponding group of four bits within the plurality of groups of four bits.

38. Arithmetic logic unit circuitry as recited in claim 28, wherein the first stage is configured to receive a subtraction select signal, the first stage being configured to use the subtraction select signal to invert each bit of a second multi-bit signal vector within the pair of multi-bit signal vectors, wherein inversion of each bit of the second multi-bit signal vector causes the sum result to represent a subtraction result.

39. Arithmetic logic unit circuitry as recited in claim 27, wherein the four-stage global carry chain implementing static propagate, kill, and generate circuitry is further configured to implement push-pull circuitry at locations where a pair of signals are mutually exclusive, the push-pull circuitry being configured to use a first signal in the pair of signals to control refresh circuitry configured to refresh a second signal in the pair of signals.

40. Arithmetic logic unit circuitry as recited in claim 39, wherein the first signal is a low signal, the refresh circuitry is a PMOS device, and the second signal is a high signal.

* * * * *